(12) United States Patent
Chan

(10) Patent No.: US 9,961,155 B1
(45) Date of Patent: May 1, 2018

(54) SHARING CONTENT VIA VIRTUAL SPACES

(71) Applicant: DROPBOX, INC., San Francisco, CA (US)

(72) Inventor: Richard W C Chan, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days. days.

(21) Appl. No.: 15/366,738

(22) Filed: Dec. 1, 2016

(51) Int. Cl.
| | |
|---|---|
| *G06F 15/16* | (2006.01) |
| *H04L 29/08* | (2006.01) |
| *H04L 29/12* | (2006.01) |
| *G06Q 50/00* | (2012.01) |
| *G06F 21/62* | (2013.01) |
| *H04L 12/58* | (2006.01) |
| *H04L 29/06* | (2006.01) |

(52) U.S. Cl.
CPC .......... *H04L 67/28* (2013.01); *G06F 21/6218* (2013.01); *G06Q 50/01* (2013.01); *H04L 51/32* (2013.01); *H04L 61/20* (2013.01); *H04L 67/02* (2013.01); *H04L 67/42* (2013.01)

(58) Field of Classification Search
CPC ......... H04L 63/20; H04L 51/32; G06Q 50/01; G06F 21/6218
USPC .................................................. 709/213, 204
See application file for complete search history.

(56) References Cited

U.S. PATENT DOCUMENTS

| | | | |
|---|---|---|---|
| 8,438,210 B2 | 5/2013 | Poder et al. | |
| 8,548,992 B2 | 10/2013 | Abramoff et al. | |
| 8,706,886 B2 | 4/2014 | Aiello et al. | |
| 9,423,922 B2 | 8/2016 | Welinder et al. | |
| 2009/0100068 A1 | 4/2009 | Gauba et al. | |
| 2009/0106671 A1 | 4/2009 | Olson et al. | |
| 2013/0132477 A1* | 5/2013 | Bosworth | G06Q 50/01 709/204 |
| 2013/0290326 A1 | 10/2013 | Lebedev | |
| 2013/0332513 A1* | 12/2013 | Honda | H04L 67/42 709/203 |
| 2014/0267414 A1 | 9/2014 | Conlan et al. | |
| 2015/0052458 A1 | 2/2015 | Rothenberger et al. | |
| 2015/0269547 A1 | 9/2015 | Fan et al. | |

FOREIGN PATENT DOCUMENTS

WO     WO 2009036417     3/2009

OTHER PUBLICATIONS

Kathleen Cameron; Declan Fleming; Giulia Hill; Adrian Turner; Mary Weppler-Selear; Audra Eagle Yun; "Next-Generation Technical Services (NGTS) Digital Asset Management System (DAMS) Requirements"; Jul. 20, 2012; http://libraries.universityofcalifornia.edu/groups/files/ngts/docs/pots/pot1_lt1a_finalreport_july2012.pdf.

* cited by examiner

Primary Examiner — Kyung H Shin
(74) Attorney, Agent, or Firm — Keller Jolley Preece

(57) ABSTRACT

One or more embodiments of a virtual space system enable one or more users to share and access digital content via a virtual space hosted by an online content management system. For example, the virtual space system can host and provide a virtual space including assets displayed within the virtual space that include links to digital content items referenced by the assets. The virtual space further facilitates creating new assets, adding new members to the virtual space, and collaborating between members of the virtual space with respect to assets added to the virtual space.

20 Claims, 13 Drawing Sheets

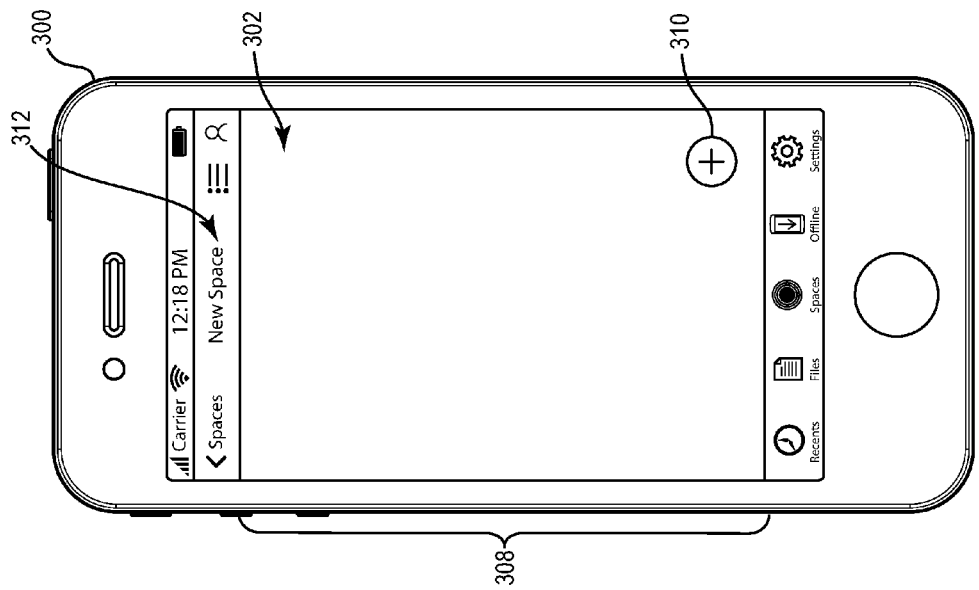
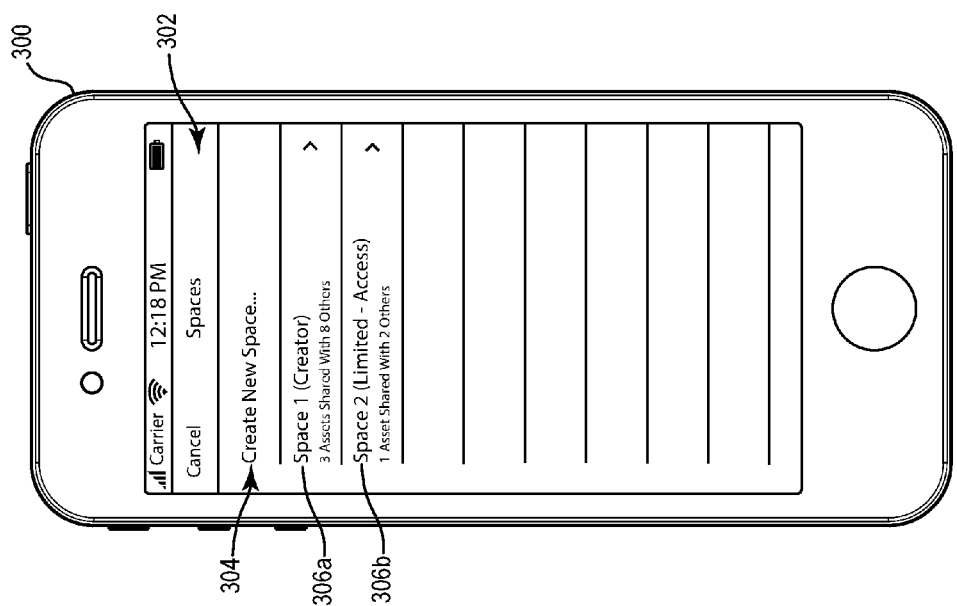
Fig. 3B
Fig. 3A

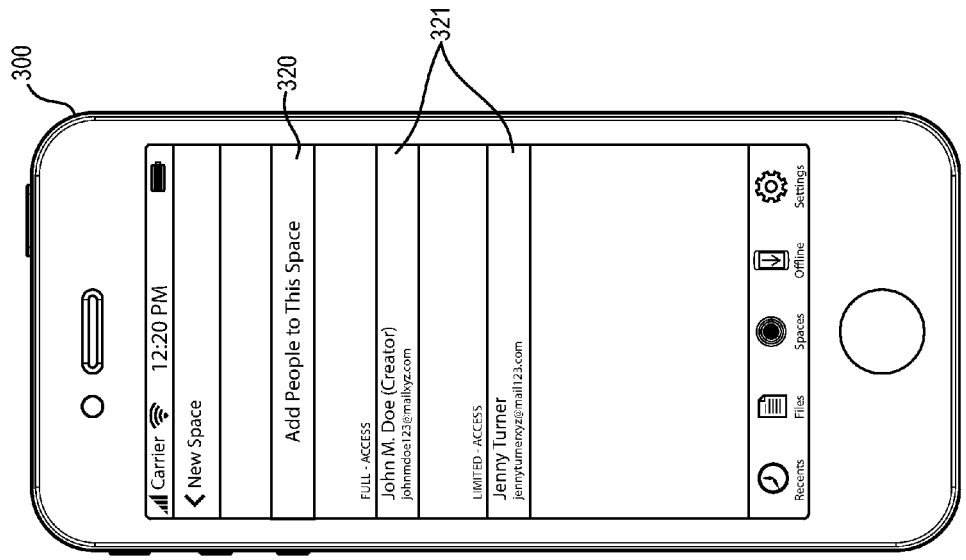
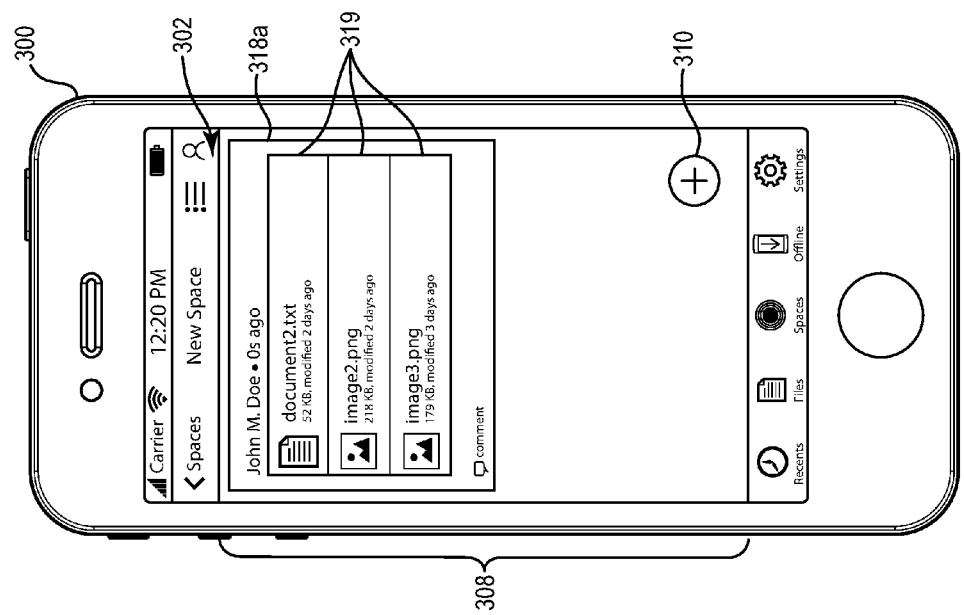
*Fig. 3F*
*Fig. 3E*

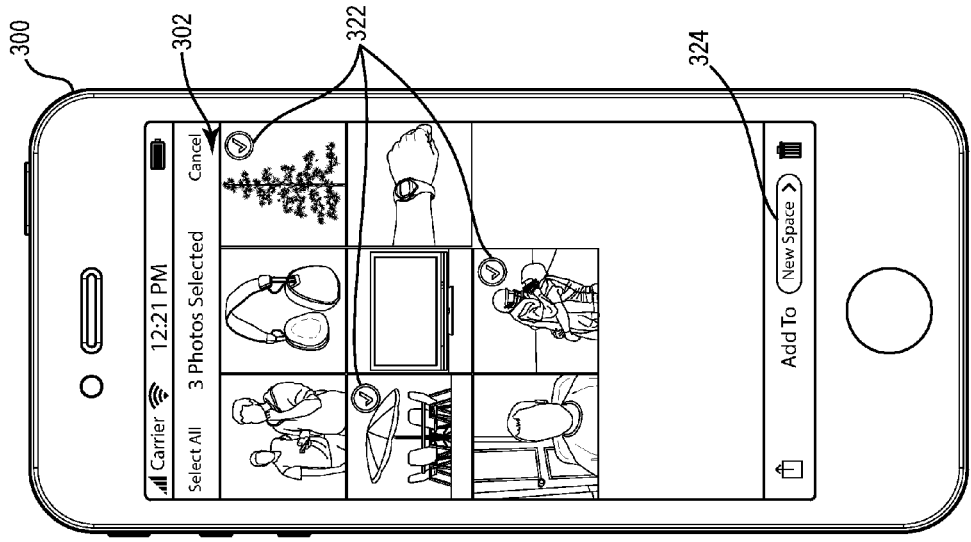
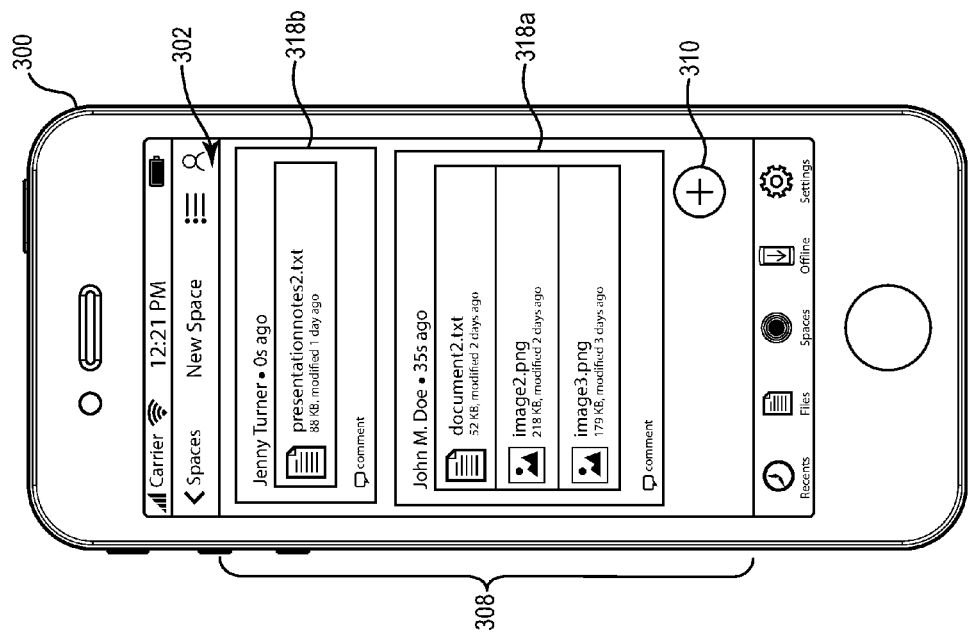
Fig. 3H
Fig. 3G

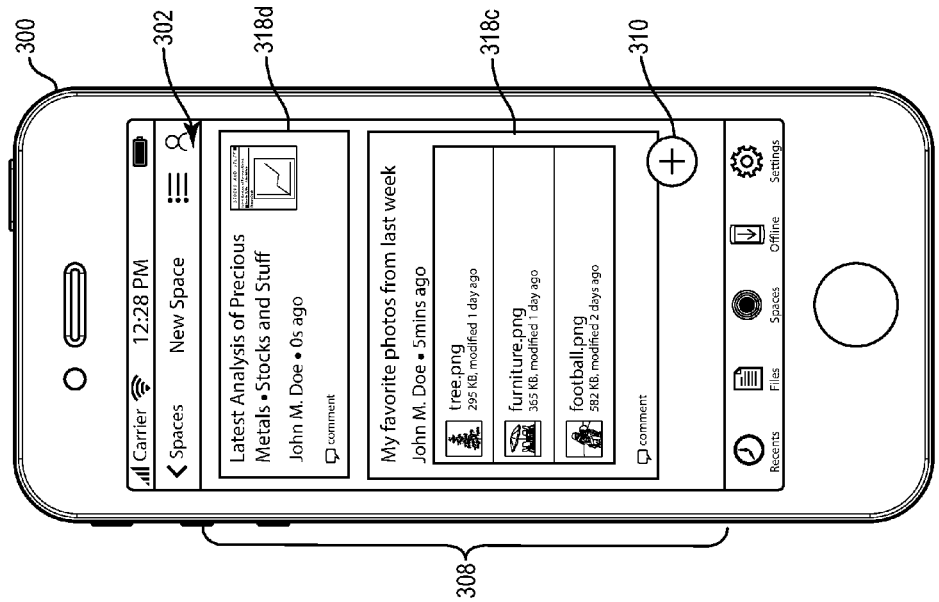
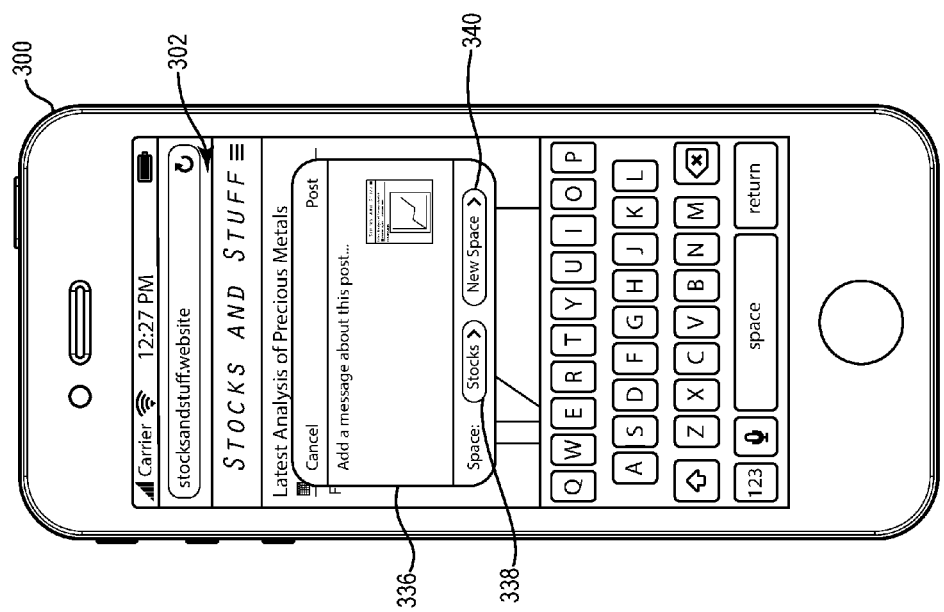
Fig. 3L
Fig. 3K

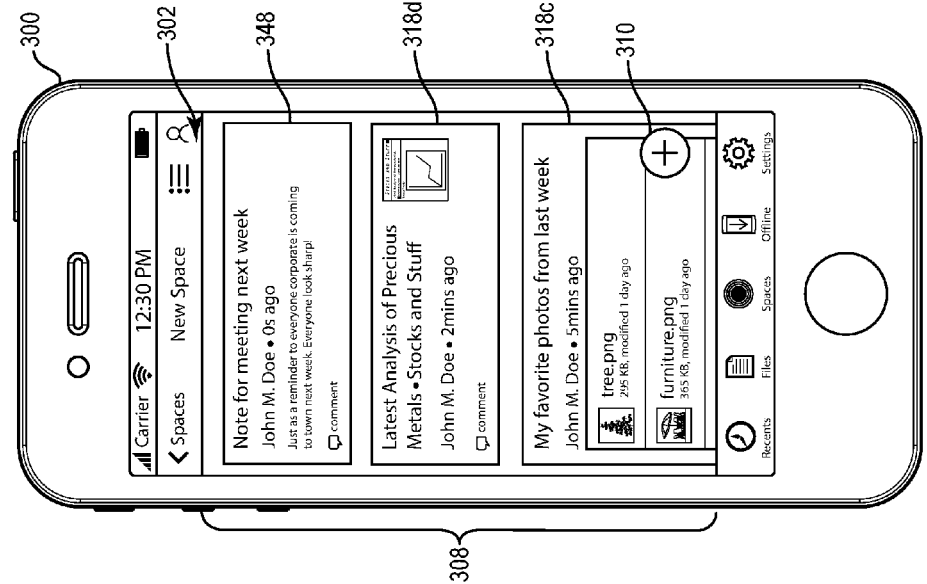
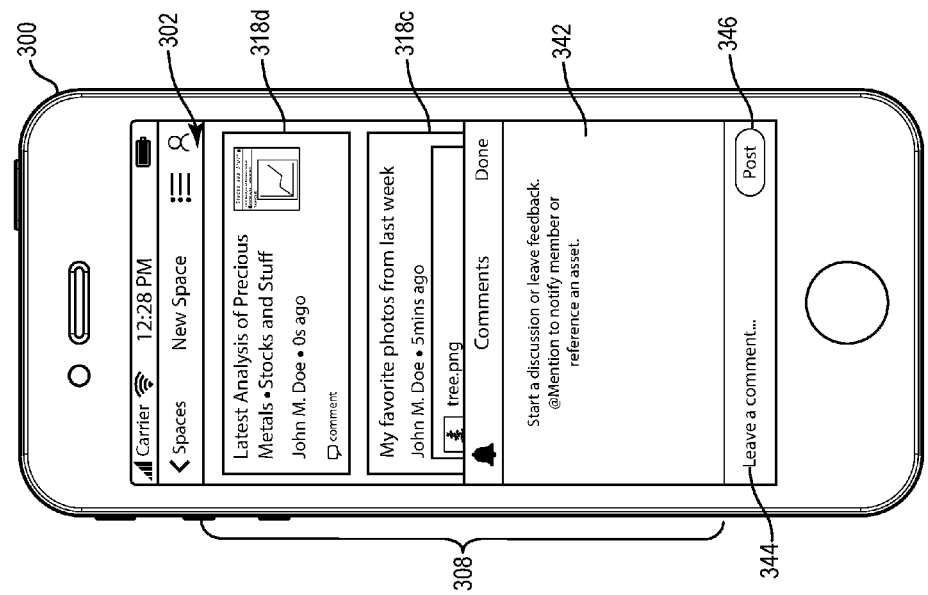
Fig. 3M
Fig. 3N

SHARING CONTENT VIA VIRTUAL SPACES

BACKGROUND

Computing devices (e.g., computers, tablets, smart phones) provide numerous ways for people to capture, store, create, share, view, and otherwise interact with digital content. For example, many conventional file sharing systems allow users to share documents, images, or other types of files with each other. For instance, some conventional file sharing systems enable users to store files on a central database, and then provide another user access to the files on the central database.

Conventional file sharing systems, however, have various disadvantages. For example, in order to share a file folder on conventional systems, a user typically goes through a manual and time consuming process to isolate files to share from files the user does not want to share. In particular, often conventional systems cause a user to manually create a file folder, and manually select and move the files the user wants to share into the newly created folder. Thus, conventional file sharing systems often become inconvenient or impossible to share files that originate from various storage locations because of the inconvenience of manually reorganizing files to be shared within a single shared folder.

Many users forego the inconvenience of reorganizing files by simply sending links to files on central database from different folders via a chain of electronic communications (e.g., email, text). For example, many users simply send an email with a link to a shared file to any users with whom an owner wants to share the file(s). Recipients of the email can subsequently share access to other files by sending a link in a responding email, thus creating a chain of emails with unorganized links to various files in an email chain. These chains of electronic communications, however, often become lengthy and disorganized. Further, where multiple links are shared across multiple emails, it often becomes difficult to track down the correct link to a desired file. Moreover, adding or removing users from a chain of electronic communications is generally inconvenient and often results in new users not receiving access to relevant files and/or providing unwanted users access to files inadvertently. Accordingly, conventional sharing systems have a number of disadvantages.

SUMMARY

Embodiments of the present disclosure provide benefits and/or solve one or more of the foregoing or other problems in the art with systems and methods for sharing digital content with other users. For example, systems and methods described herein include receiving a request from a user to share digital content with one or more additional users. In response to receiving the request, systems and methods described herein generate a virtual space having members that include the user and the one or more additional users. Example systems and methods further create an asset to add to the virtual space, where the asset includes a shared link to the digital content. In addition, systems and methods described herein provide access to digital content referenced within the asset(s) of the virtual space, thus providing members of the virtual space access to digital content.

Further, systems and methods described herein provide an interactive experience to members of the virtual space that enables users to conveniently share and access digital content and collaborate with other members of the virtual space. For example, systems and methods described herein provide a graphical user interface including a display of the virtual space and any assets therein. Generally, a member of the virtual space can interact with the virtual space to access digital content shared within the virtual space, as well as add new digital content to the virtual space to share with other members of the virtual space.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

Figure 1:
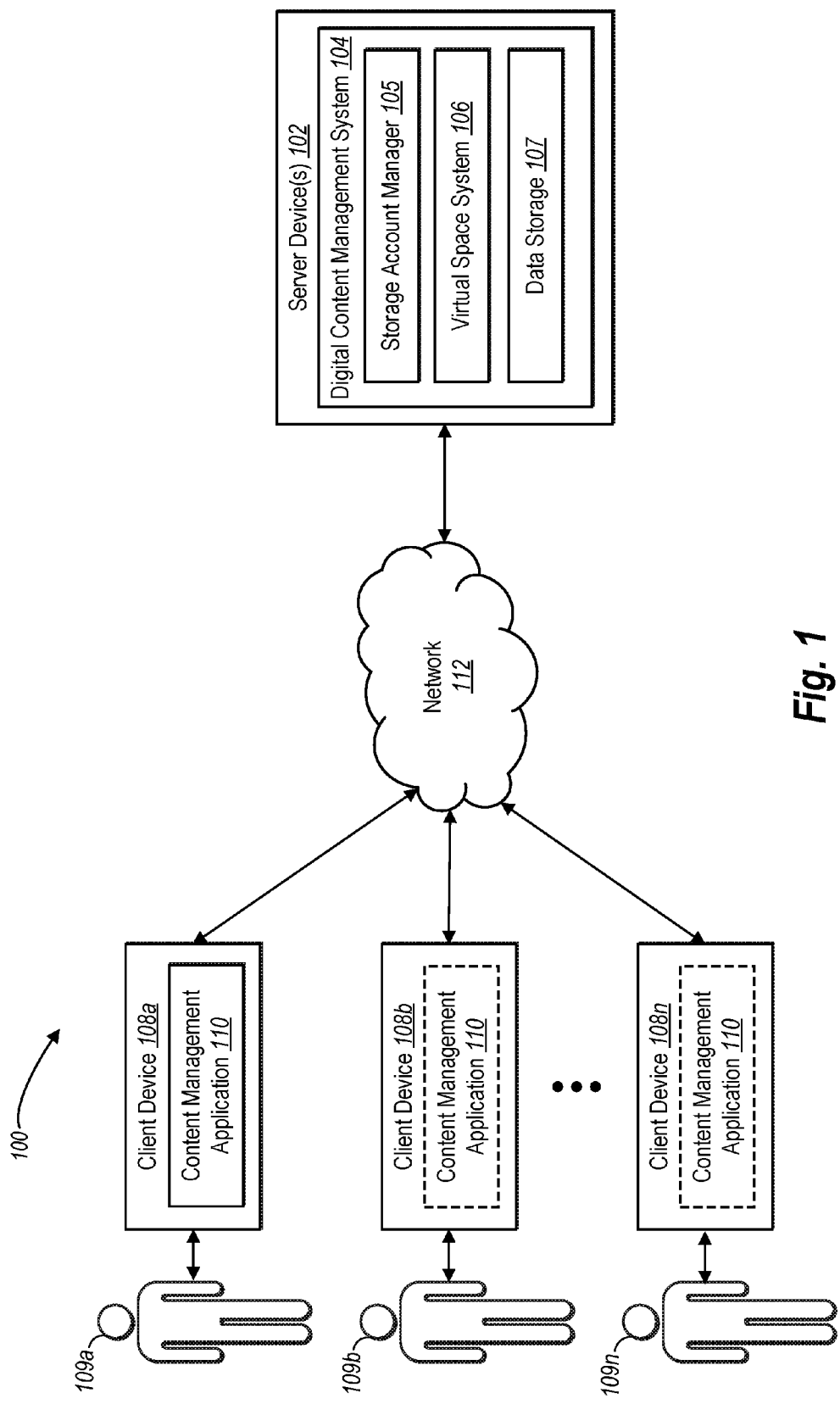
FIG. 1 illustrates a block diagram of an example environment for implementing a virtual space system in accordance with one or more embodiments.

The present disclosure provides one or more embodiments of a virtual space system that enables members of a virtual space (e.g., a shared digital environment) to share digital content between the members of the virtual space. In particular, the virtual space system facilitates generation of a virtual space that enables one or more members of the virtual space (e.g., users having access to the virtual space) to share digital content with other members of the virtual space. For example, a user of a digital content management system can create a virtual space and invite other users to join the virtual space. The user and other users can subsequently add, access, and otherwise share digital content using the virtual space.

In one or more embodiments, based on receiving a request to share a digital content item, the virtual space system creates an asset (e.g., a data object) that includes a shared link to the digital content item associated with the request to share. For example, a shared link is a pointer that references a storage location of the digital content item (e.g., a private storage location corresponding with a user account on a digital content management system). Accordingly, a virtual space does not actually include a copy of a digital content, but rather, a virtual space includes one or more assets that include one or more shared links pointing to one or more files stored at various storage locations.

Because a virtual space is not a storage space for shared digital content items, a user does not need to go through a time consuming process to create a "share folder," and the subsequently move digital content items the user wants to share to the new folder. Instead, a user can quickly select digital content items from a variety of storage locations to share via the virtual space, and the virtual space system generates an asset that includes shared links to the digital content items stored in a variety of locations. Thus, the virtual space system enables a member of a virtual space to share access to digital content items from various storage locations without requiring that the member spend time preparing folders and/or moving or copying digital content items to a specific folder.

In addition, the virtual space system allows multiple members of a virtual space to continuously share additional digital content with other members of the virtual space in an organized manner. For example, in response to a member of a virtual space requesting to share a first digital content item with other members of the virtual space, the virtual space system generates a first asset including a shared link to the first digital content item and associates the first asset with the virtual space. Further, for example, in response to a different member requesting to share a second digital content item, the virtual space system creates a second asset including a shared link to the second digital content item and associates the second asset together with the first asset with the virtual space. Thus, the virtual space provides an environment and platform that organizes the sharing of various digital content items, stored at various storage locations, and being shared from various users, in a manner that is intuitive, efficient, and convenient.

Moreover, the virtual space system includes features and functionality that provide a collaborative environment to members of the virtual space. For example, members can append, comment, or otherwise add notes to assets within a virtual space without modifying the actual digital content (e.g., the actual digital content file located on a private storage space). Moreover, members can create a communication thread within a virtual space and in-line with assets to facilitate asset-related or general discussions among members of the virtual space. Further, the virtual space system enables members of the virtual space to conveniently share digital content while maintaining or modifying permissions associated with accessing the digital content linked by the various assets.

In addition to the above features and advantages, the virtual space system improves the function of computing devices. For example, the virtual space system provides a digital content sharing platform that facilitates the sharing of digital content from various storage sources without duplicating the shared digital content. For example, in one or more embodiments, the virtual space system can share a single storage instance of a digital content item to multiple members of multiple virtual spaces without creating a duplicate copy of the digital content item. Accordingly, the virtual space system can significantly reduce the storage burden, communication resource burden, and processing burden associated with sharing digital content items compared to conventional systems.

As used herein, a "virtual space" refers to an environment or platform that enables the sharing of digital content items between users. For example, a virtual space can refer to a digital "room" or "space" hosted by a virtual space system that identifies, references, or otherwise provides access to digital content. A virtual space provides, to any number of defined members, access to digital content items associated with the virtual space. A virtual space further provides a platform whereby members of the virtual space can access, edit, annotate, download, store, and/or otherwise interact with digital content associated with a virtual space. Moreover, a virtual space includes information that, when provided to a client device, enables the client device to present a display of a graphical representation of a virtual space and provide a graphical user interface within which users can interact with the contents of the virtual space.

As used herein, "digital content" refers to any digital data. For example, a "digital content item" or "content item" can include a defined portion of digital data (e.g., a data file). Examples of digital content items include, but are not limited to, digital images, digital video files, digital audio files, electronic document files, streaming content, contact lists, and/or folders that include one or more digital content items. It is appreciated that digital content can refer to digital content stored by the digital content management system, digital content stored locally on a client device, and/or digital content from any third-party source (e.g., a web server).

As used herein, a "member" of a virtual space or "virtual space member" refers to any user having access to a virtual space. For example, a member can refer to a user that creates the virtual space, or, any users that have been invited to and/or joined the virtual space. In one or more embodiments, a member refers to one or more users that have access to the virtual space. In some embodiments, members of a virtual space may have an account on a digital content management system that may host a virtual space system, although in most embodiments, members of a virtual space are not required to have an account with a digital content management system, even when a digital content management system hosts the virtual space. As will be described in further detail below, members of the virtual space can have varying levels of access or permissions associated with digital content of the virtual space.

As used herein, an "asset" refers to a discrete data object associated with a virtual space, where data within the data object references digital content stored at one or more storage locations. For example, in one or more embodiments, an asset can include one or more shared links that point to, or otherwise reference, one or more digital content items that a member of a virtual space has shared with another member of the virtual space. In addition to one or more shared links, an asset further can include information associated with shared digital content item(s) including, for example, a location, an owner, a size, a file-type, permissions, and/or member information. In addition, an asset can include annotations or notes from various members of a virtual space. In one or more embodiments, a single asset corresponds to a single request to share one or multiple digital content items with members of the virtual space.

Additional features and characteristics of the virtual space system are described below with respect to the figures. For example, FIG. 1 illustrates an example virtual space environment 100. In general, and as illustrated in FIG. 1, virtual space environment 100 includes server device 102 having digital content management system 104 implemented thereon. As further shown, digital content management system 104 includes storage account manager 105, virtual space system 106, and data storage 107. As further shown in FIG. 1, virtual space environment 100 includes client devices 108a-n associated with respective users 109a-n. As illustrated in FIG. 1, one or more of client devices 108a-n includes content management application 110 implemented thereon. As further shown in FIG. 1, client devices 108a-n can communicate with server device 102 through network 112.

In general, components 104-107 of server device(s) 102 cooperate to provide one or more virtual spaces to users 109a-n. It is appreciated that each of components 104-107 of server device 102 may be in communication with one another using any suitable communication technologies. In addition, although components 104-107 are shown separately in FIG. 1, any of components 104-107 may be combined into fewer components, such as into a single component, or divided into more components as may serve a particular embodiment. In addition, components 104-107 may be located on, or implemented by, one or more computing devices, such as one or more client devices 108a-n and/or one or more server device(s) 102.

Each of components 104-107 of server device 102 can further comprise software, hardware, or both. For example, each of components 104-107 can comprise one or more instructions stored on a computer-readable storage medium and one or more processors of one or more computing devices to execute instructions. When executed by the one or more processors, the computer-executable instructions cause a computing device to perform the methods described herein. Alternatively, components 104-107 can comprise hardware, such as a special purpose processing device to perform a certain function or group of functions.

Further, client devices 108a-n generally include any one of various types of computing devices. For example, each of client devices 108a-n can include a mobile device (e.g., smart phone), tablet, laptop computer, desktop computer, or any other type of computing device as further explained below with reference to FIG. 6. In addition, server device 102 can include one or multiple computing devices as explained below with reference to FIG. 6. Client devices 108a-n, server device(s) 102, and network 112 may communicate using any communication platforms and technologies suitable for transporting data and/or communication signals, including any known communication technologies, devices, media, and protocols supportive of remote data communications, examples of which are also described below with reference to FIG. 7.

As mentioned above, server device 102 includes digital content management system 104 having storage account manager 105 implemented thereon. In one or more embodiments, storage account manager 105 manages digital content items for user accounts of any number of users 109a-n. In particular, storage account manager 105 can provide cloud storage or other remote storage of digital content items within private storage accounts associated with respective users 109a-n. As an example, first user 109a of first client device 108a can have a private storage space (e.g., accessible via a user account of first user 109a) on digital content management system 104 that enables first user 109a to remotely store images, documents, or other digital content on server device 102 (e.g., as an alternative or in addition to storing digital content locally on first client device 108a). It is appreciated that some or all of users 109a-n can have respective private storage spaces maintained by storage account manager 105 on digital content management system 104.

As further shown in FIG. 1, digital content management system 104 includes virtual space system 106 that generates and provides access to virtual spaces hosted by digital content management system 104. For example, virtual space system 106 can facilitate creation of a virtual space and provide, to users 109a-n of client devices 108a-n, access to the virtual space. To illustrate, virtual space system 106 can provide a graphical user interface via first client device 108a to first user 109a that enables first user 109a to create a virtual space accessible to each of first user 109a and second user 109b. In one or more embodiments, first user 109a requests to share a digital content item with second user 109b, and in response, virtual space system 106 creates a virtual space. Alternatively, in one or more embodiments, first user 109a sends a request to simple create a new virtual space without any assets referencing digital content, and in response, virtual space system 106 creates a virtual space that initially does not include any assets.

Once virtual space system 106 creates a virtual space, virtual space system 106 can provide first user 109a and second user 109b a graphical representation of the virtual space to allow first user 109a and second user 109b to interact with the virtual space by accessing assets of the virtual space that reference the digital content, adding new assets that reference additional digital content, and/or otherwise collaborating. For example, as will be described in further detail below, members of a virtual space can interact with a virtual space GUI to access, edit, annotate, download, store, and/or otherwise interact with digital content referenced within assets of the virtual space. In addition, members of the virtual space can collaborate by adding notes within the virtual space. Additional features and functionality with respect to virtual spaces is described below.

In addition, as shown in FIG. 1, server device 102 includes data storage 107. Data storage 107 may include information utilized by digital content management system 104 including storage account manager 105 and virtual space system 106 to facilitate features and functionality of digital content management system 104 described herein. For example, data storage 107 may include user data including any information associated with users 109a-n. As another example, data storage 107 may include content item data including digital content items and information associated with the digital content items. As a further example, data storage 107 may include virtual space data including information associated with virtual spaces, members, assets, and other content provided via virtual spaces. Data storage 107 can further include any other information utilized by digital content management system 104 to implement features and functionality described herein.

As further shown in FIG. 1, one or more of client devices 108a-n include content management application 110. In one or more embodiments, content management application 110 refers to a software application installed on a client device that enables one or more of users 109a-n to create, access, view and interact with a virtual space. For example, in one or more embodiments, content management application 110 provides a graphical user interface that enables a user to interact with a virtual space. In one or more embodiments, content management application 110 is corresponds to, and is customized for, digital content management system 104. Alternatively, content management application 110 is a web browser or other application that can be used to communicate with digital content management system 104 to allow a user to view and interact with a virtual space. Additional detail with respect to providing a graphical user interface for user interaction with a virtual space is described below.

Figure 2:
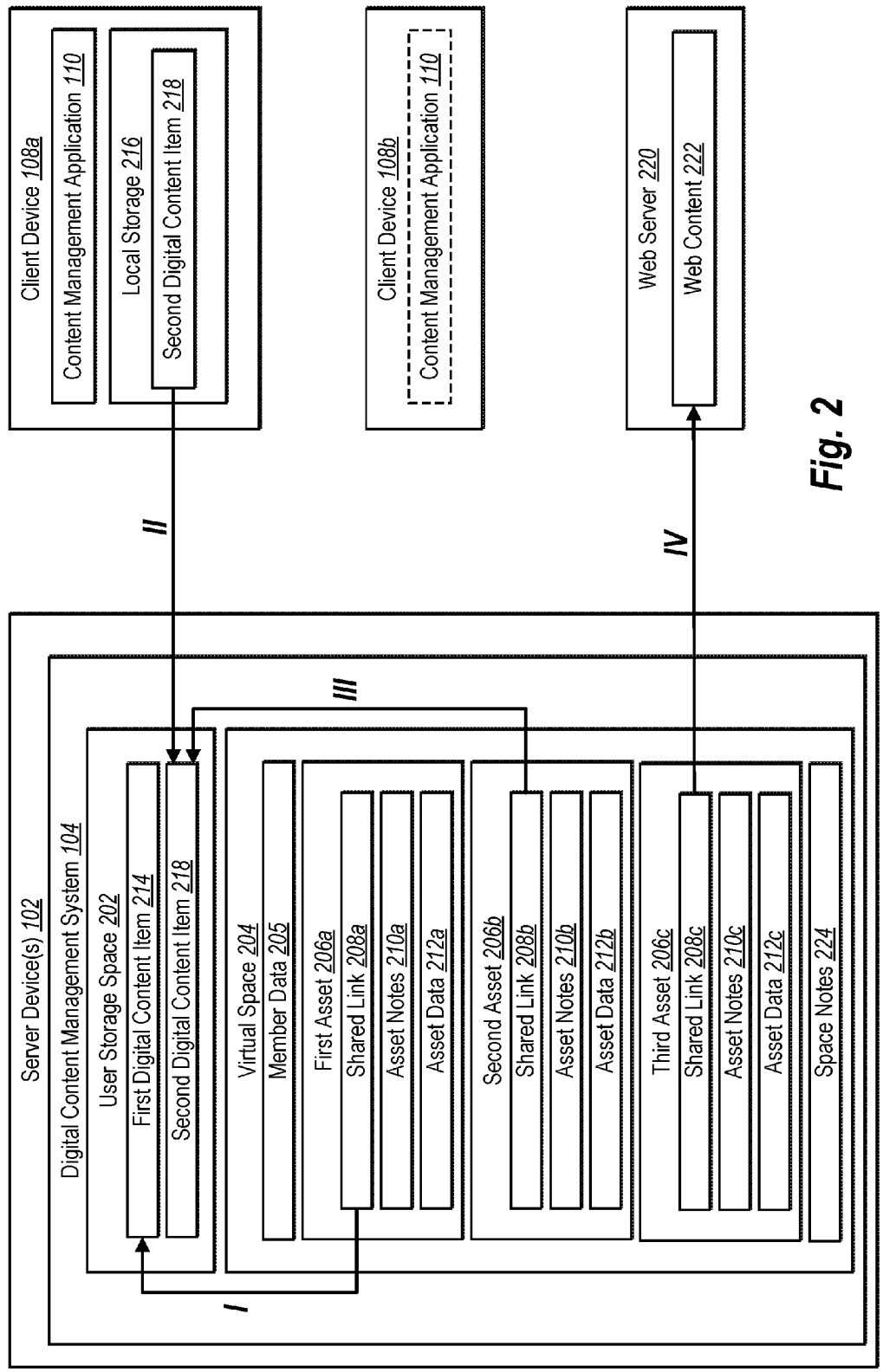
FIG. 2 illustrates a block diagram of an example virtual space hosted by a digital content management system in accordance with one or more embodiments.

Referring now to FIG. 2, addition details regarding digital content management system 104 and virtual space system 106 will be discussed. For purposes and ease of explanation, the details discussed with reference to FIG. 2 will be explained in terms of digital content management system 104 performing various acts, methods, and providing various features related to virtual spaces. It should be understood, however, that digital content management system 104 includes various components (e.g., storage account manager 106, virtual space system 106, and data storage 107) that perform the various acts, methods, and provide the various features related to virtual spaces, as described above with reference to FIG. 1.

As shown in FIG. 2, digital content management system 104 includes user storage space 202 and virtual space 204. As shown in FIG. 2, user storage space 204 can refer to a private storage space associated with a user (e.g., account holder) of digital content management system 104. In one or more embodiments, digital content management system 104 includes any number of private storage spaces associated with respective users. In addition, as shown in FIG. 2, digital content management system 104 hosts virtual space 204. Features and functionality of digital content management system 104 will be described in further detail below.

As mentioned above, and as will be described in further detail below, digital content management system 104 facilitates creation of virtual spaces, associating members with the virtual spaces, and sharing content between members of the virtual spaces. In addition, digital content management system 104 provides features and functionality that enable various users to collaborate with respect to the content shared via the virtual space.

For example, as shown in FIG. 2, digital content management system 104 creates virtual space 204. In one or more embodiments, digital content management system 104 creates virtual space 204 in response to receiving a user input to create virtual space 204. As an example, in one or more embodiments, digital content management system 104 creates the virtual space in response to a user identifying at least one digital content item (e.g., first digital content item 214) and requesting to share the digital content item with another member of virtual space 204. Alternatively, in one or more embodiments, digital content management system 104 creates virtual space 204 in response to receiving a user request to create virtual space 204 (e.g., with or without identifying a digital content item to share with one or more members of virtual space 204). Additional detail with regard to creating virtual space 204 is described in further detail below with respect to FIGS. 3A-3F.

As further shown in FIG. 2, virtual space 204 includes member data 205 including information associated with any number of members of virtual space 204. For example, member data 205 includes an identification of each member of virtual space 204 including, for example, a username, email address, phone number, or other identifier of a user. In one or more embodiments, digital content management system 104 utilizes the identifier for each member to communicate invitations, notifications, or other information to members of virtual space 204. As an example, in one or more embodiments, digital content management system 104 communicates invitations to join virtual space 204 to invited users via an identifier for the invited users. In addition, once one or more members have joined virtual space 204, in one or more embodiments, digital content management system 104 communicates various notifications to members of virtual space 204 via identifiers for associated members.

In one or more embodiments, member data 205 includes authentication information associated with members of virtual space 204. For example, in one or more embodiments, member data 205 includes login and password information to authenticate access of a particular member. In one or more embodiments, login information includes the identifier used for communicating the information and/or notifications to the member. In addition, the password may include an assigned or selected password for each member of virtual space 204. In one or more embodiments, digital content management system 104 performs an authentication for any user requesting access to virtual space 204 to verify that a user is a member of virtual space 204.

In one or more embodiments, member data 205 includes permission information associated with each of the members. For example, while one or more embodiments of virtual space 204 include members that each have the same level of access to digital content items referenced by virtual space 204, one or more embodiments of virtual space 204 may similarly include members having different levels of access to digital content items referenced by virtual space 204. As such, member data 205 can include an identification of each member as a full-access member or limited access member. As used herein, a "full-access member" of virtual space 204 refers to a member of virtual space 204 having a higher level of access to one or more digital content items referenced by virtual space 204 than a "limited access member" of virtual space 204. As an example, a full-access member may have read and write access to a document shared with virtual space 204 while a limited-access member may have read-only access to the document shared with the virtual space 204. In one or more embodiments, member data 205 includes permission information for respective members of virtual space 204 corresponding to any number of levels of access to digital content items shared with virtual space 204.

In addition to identifying members having access to virtual space 204, in one or more embodiments, a user can specify one or more digital content items to share with members of virtual space 204. For example, a user can request to share one or a combination of different digital content items with other members of virtual space 204. A request to share one or more digital content items can include an identification of one or multiple digital content items. Further, a request to share can include an identification of one or a combination of different types of digital content items. For instance, a request to share can include an identification of one or more digital images, digital video files, digital audio files, electronic document files, streaming content, contact lists, web content, and/or folders.

In addition a request to share can include an identification of one or more digital content items from various sources. For example, the request to share can include an identification of digital content stored on user storage space 202. In addition, or as an alternative, the request to share can include an identification of digital content stored locally on a client device (e.g., local storage 216 of first client device 108a) not previously stored on digital content management system 104. As another example, in one or more embodiments, the request to share can include an identification of digital content stored on a remote server (e.g., web content 222 on web server 220). Moreover, in one or more embodiments, a request to share includes an identification of digital content items from multiple different sources. As an example, a request to share can include a request to share first digital content item 214 previously stored on user storage space 202 and second digital content item 218 stored on local storage 216 of first client device 108a.

Upon receiving the request to share one or more digital content items with members of virtual space 204, digital content management system 104 generates an asset to add to virtual space 204 that facilitates sharing of the one or more digital content items identified by the request to share. In one or more embodiments, to facilitate sharing of a digital content item, digital content management system 104 creates an asset including a shared link that references the shared digital content item. For example, digital content management system 104 provides a shared link within the created asset that point to or otherwise references a storage location of the shared digital content item. In one or more embodiments, the shared link simply points to a storage location. Alternatively, in one or more embodiments, the shared link further includes authentication or access information for selectively providing access to the digital content item not otherwise accessible to users that are not members of virtual space 204.

For example, as shown in FIG. 2, virtual space 204 includes assets 206a-c that each include shared links 208a-c. In one or more embodiments, digital content management system 104 creates each of assets 206a-c in response to a corresponding share request. Thus, each of assets 206a-c correspond to respective individual share requests. The share requests may original from the same member of virtual space 204 or multiple different members of virtual space 204.

As shown in FIG. 2, each of assets 206a include shared links 208a-c. As further shown, each of shared links 208a-c include references to digital content items from different sources. For example, first asset 206a includes first shared link 208a that references first digital content item 214 previously stored on user storage space 202 hosted by digital content management system 104. In particular, in response to receiving a request to share that includes an identification of first digital content item 214 stored on user storage space 202, digital content management system 104 generates first asset 206a including first shared link 208a. As indicated by numeral I in FIG. 2, first shared link 208a points to first digital content item 214.

In addition, second asset 206b includes second shared link 208b that references second digital content item 218 previously stored on local storage 216 of first client device 108a. In particular, in response to receiving (e.g., from first client device 108a) a request to share second digital content item 218 stored on local storage 216 of client device 108a, digital content management system 104 uploads a copy of second digital content item 218 as indicated by numeral II. In addition, as indicated by numeral III in FIG. 2, second shared link 208b of second asset 206b points to the copy of second digital content item 218 uploaded to user storage space 202 by digital content management system 104.

Furthermore, third asset 206c includes third shared link 208c that references web content 222 on web server 220. In particular, in response to receiving a request to share web content 222 with members of virtual space 204, digital content management system 104 generates third asset 206c including third shared link 208c that references a location on web server 220 associated with web content 222. For example, as indicated by numeral IV, third shared link 208c points to web content 222 on web server 220. In one or more embodiments, rather than pointing directly to a location on web server 220, digital content management system 104 generates a copy of web content 222 stored on user storage space 202 and generates third shared link 208c pointing to web content stored by digital content management system 104.

As mentioned above, digital content management system 104 generates an asset including one or multiple shared links in response to receiving a request to share one or multiple digital content items with other members of virtual space 204. In one or more embodiments, digital content management system 104 generates a shared link by determining a location (e.g., storage address) of the shared digital content item. In addition, digital content management system 104 identifies a file type of the shared digital content item and determines an icon type that represents the identified file type. Further, digital content management system 104 associates the icon type with the determined location of the shared digital content item. Finally, digital content management system 104 generates a shared link that includes information about the shared digital content item (e.g., location, file type) and includes a selectable icon corresponding to the file type.

In one or more embodiments, digital content management system 104 generates an asset including a number of shared links corresponding to the number of digital content items shared to virtual space 204. Further, in one or more embodiments, each of the shared links of the asset includes a file icon corresponding to the file type of each shared digital content item. In addition, digital content management system 104 provides the shared links within an asset of virtual space 204 and enables members of virtual space 204 to select the icon to access the shared content item based on the storage location associated with the respective icon(s).

By providing assets that include a number of shared links within a virtual space, digital content management system 104 overcomes several difficulties associated with providing links to digital content items via email, text, or other communications. For example, unlike transmitted links that enable recipients to distribute a link without the knowledge of an original sender, digital content management system 104 includes one or more shared links within an asset that is protected within the virtual space so that members are unable to send the shared link to other users without knowledge of the user (or other members of the virtual space) that shared the digital content item with the virtual space.

In addition, digital content management system 104 provides shared links only to members of the virtual space. In particular, digital content management system 104 enables a user to share a digital content item a limited number of members that have been invited to the shared space and authenticated by digital content management system 104 to have access to the shared space. Moreover, in one or more embodiments, the only way some of the members can access the shared digital content item is via an invitation to the virtual space.

Further, due to the character of the shared link(s) included within the asset(s) of the virtual space, digital content management system 104 provides virtual space 204 that provides access to any number of digital content items without utilizing substantial storage space on a client device or personal storage space of digital content management system 104. For example, as mentioned above, each of the assets within virtual space 204 include shared links that point to storage locations of the referenced digital content items. As such, digital content management system 104 avoids making unnecessary or redundant copies of shared digital content items. In particular, digital content management system 104 provides virtual space 204 that references digital content items without making redundant copies of the shared digital content items.

Thus, digital content management system 104 overcomes difficulties associated with generating shared folders and/or transmitting links via email, text, or other communications. For example, digital content management system 104 saves storage space on digital content management system 104 and/or client devices, provides security and control of distribution of shared digital content items, and enables collaboration between members of virtual space 204.

As further shown in FIG. 2, each of assets 206a-c include one or more asset notes 210a-c. For example, as mentioned above, digital content management system 104 enables members of virtual space 204 to interact with virtual space 204 and add one or more asset notes 210a-c to one or more of corresponding assets 206a-c. In particular, digital content management system 104 provides an interface that enables members to interact with an asset to generate an asset note. In particular, digital content management system 104 provides options to members to annotate an asset, compose a note, attach a sticker, provide a user rating, or other action that provides information to other members of virtual space 204 with respect to the asset. In one or more embodiments, digital content management system 104 generates an asset note by adding the note, annotation, or other information to an asset without modifying one or more digital content items referenced within the asset. In this way, members of virtual space 204 can collaborate and communicate with respect to an asset without modifying digital content referenced or linked by the asset.

As further shown in FIG. 2, each of assets 206a-c include asset data 212a-c including any information associated with respective assets 206a-c. For example, asset data can include any information displayed within an asset of virtual space 204. Examples of asset data include date or time of creation of an asset, file size of one or more digital content item linked by the asset, an identification of which member created the asset or owns the digital content item the asset references, which users have accessed the asset, the last user to access the asset, as well as any other information that pertains to an asset. Additional detail with regard to asset data that the system provides for display to members of a virtual space is described below in connection with FIGS. 3A-3N.

In addition to displayable information, asset data 212a-c can include permissions and other properties of assets 206a-c. In particular, asset data 212a-c can include metadata and other information stored in association with respective assets 206a-c, but not necessarily displayed together with a display of an associated asset. For example, asset data 212a-c can include an identification of one or more members having full access (e.g., read, edit, download) to digital content referenced within assets 206a-c. Moreover, asset data 212a-c can include an identification of one or more other members having limited access (e.g., read-only) to digital content referenced within assets 206a-c. In one or more embodiments, digital content management system 104 enables one or more members (e.g., creator of virtual space 204, creator of asset, full-access member) to modify permissions or other asset data. For example, digital content management system 104 enables a creator of virtual space 204 or creator of a particular asset to modify permissions that specify which of members can access, download, edit, or otherwise interact with a shared digital content item.

In one or more embodiments, different members of virtual space 204 can have varying levels of permissions to the various assets within virtual space 204. For example, in one or more embodiments, digital content management system 104 designates one or more members as full-access members of virtual space 204, and accordingly, full-access members have read, download, and edit capabilities for each digital content item referenced by any asset 206a-c of virtual space 204. In contrast, in one or more embodiments, digital content management system 104 designates one or more members as limited-access members of virtual space 204, where limited-access members have read-only access to all assets 206a-c of virtual space 204.

In addition, rather than generally designating members as full-access or limited-access members with respect to all assets of virtual space 204, in one or more embodiments, digital content management system 104 facilitates selective application of permissions to different assets of virtual space 204. For example, in one or more embodiments, digital content management system 104 provides full access to a member for first asset 206a and provides limited access to the member for second asset 206b. Accordingly, digital content management system 104 may designate permissions on an asset-by-asset basis and/or on a member-by-member basis prior to or after an asset has been added to virtual space 204.

In addition to defining a level of access to digital content items that an asset references, digital content management system 104 further defines permissions on a virtual-space-wide basis for each member. For example, in one or more embodiments, virtual space 204 includes space-wide data (not shown in FIG. 2) that includes permissions defining which members are allowed to share digital content items within virtual space 204. For example, in one or more embodiments, permissions within space-wide data allow only some of members to add content items to virtual space 204, while enabling all members to access virtual space 204. Additional examples of space-wide data include permissions on which members can invite additional members to virtual space 204, can remove members from virtual space 204, can provide comments, or can perform other actions described herein.

As further shown in FIG. 2, virtual space 204 includes space notes 224 including one or more notes composed or added by members of virtual space 204. For example, space notes 224 can include one or more member-composed notes added to the virtual space 204 in-line with each of assets 206a-c (e.g., as shown in FIG. 3N). Space notes 224 can differ from asset notes 210a-c in that space notes 224 are not directly associated with or a part of any particular asset 210a-c and are added to virtual space 204 independent from any particular asset.

In one or more embodiments, space notes 224 represents one or more additional assets that only include a user comment and do not reference a digital content item. In other words, upon receiving a space-wide comment from a member (as described below with reference to FIG. 3N), digital content management system 104 generates a comment asset that includes the comment, and associates the comment asset with virtual space 204. Other members can respond to the space-wide comment by providing a response directed at the space-wide comment via a client device, and the digital content management system 104 can receive and add the response to the comment asset. In other words, a comment asset can represent a communication thread that is distinct and separate from a particular digital content item. Accordingly, a comment asset can allow members to collaborate generally, while asset-specific comments allow members to collaborate specifically with respect to digital content items.

As mentioned above, digital content management system 104 can facilitate display of virtual space 204 within a graphical user interface on client devices associated with members 205 of virtual space 204. For example, digital content management system 104 can provide data of virtual space 204 via network 112 to client devices (e.g., client devices 108a-n) associated with members 205 (e.g., users 109a-n) of virtual space 204 that causes each client device to present a representation of virtual space 204 on a display of the client device. For example, where a client device includes a specific content management application (e.g., content management application 110), digital content management system 104 can cause client device to display a representation of virtual space 204 within a graphical user interface of the content management application. Alternatively, where a client device does not include a specific content management application, digital content management system 104 can provide a graphical user interface within a web browser or other third-party application that presents virtual space 204.

In one or more embodiments, digital content management system 104 provides multiple virtual spaces to a single user. Each virtual space may include one or more of the same members as virtual space 204 as well as other members that are not members of virtual space 204. Thus, digital content management system 104 enables a user that belongs to a first virtual space and a second virtual space to selectively share digital content with different subsets of users.

In one or more embodiments, digital content management system 104 enables a user (or different users) to share a particular digital content item to different virtual spaces. For example, in response to receiving a first share request to share a digital content item within a first visual space, digital content management system 104 generates a first asset for the first visual space that includes a shared link to the digital content item. Furthermore, in response to receiving a second share request to share the same digital content item within a second virtual space, digital content management system 104 generates a second asset for the second virtual space that includes a shared link to the same digital content item. In addition, rather than making a copy or duplicates of the digital content item, each of the shared links reference the same digital content item at the same storage location (e.g., on a user's private storage space 202 within digital content management system 104).

Moreover, in one or more embodiments, digital content system 104 facilitates notification of members of virtual space 204. In particular, digital content management system 104 provides various notifications to members of virtual space 104. As an example, in one or more embodiments, digital content management system 104 provides a notification to a user when invited to join virtual space 204. As another example, digital content management system 104 provides a notification to members in response to detecting an addition of an asset, asset note, or space note to virtual space 204. In another example, digital content management system 104 provides a notification in response to detecting that a linked digital content item has been edited or that the destination of a digital content item has changed. Further, in one or more embodiments, digital content management system 104 provides a notification to members upon addition or removal of one or more members to or from virtual space 204.

In one or more embodiments, digital content management system 104 facilitates removal of one or more assets from virtual space 204. For example, digital content management system 104 provides an option for an owner of an asset (or other member of virtual space 204) to select an asset and remove the asset from virtual space 204. In response to removal of the asset, digital content management system 104 updates a display of virtual space 204 to exclude the removed asset. In addition, digital content management system 104 removes the asset without deleting or modifying any digital content items linked by the removed asset.

Moreover, while various embodiments described herein relate to adding assets that reference one or more digital content items, in one or more embodiments, digital content management system 104 creates an asset that references another virtual space. For example, digital content management system 104 may create an asset for a first virtual space that includes a shared link that points to a second virtual space. In response to adding the asset that references the second virtual space, digital content management system 104 alters permissions of the second virtual space to enable members of the first virtual space to access the second virtual space including one or more assets and digital content items referenced by assets of the second virtual space. In addition, digital content management system 104 enables members to switch between the virtual spaces. For example, in response to detecting a shared link within a first virtual space that links to a second virtual space, digital content management system 104 can cause a client device to switch from a display of the first virtual space to a display of the second virtual space.

As mentioned above, digital content management system 104 facilitates a display of one or more virtual spaces on client devices of members of the virtual spaces. For example, FIGS. 3A-3N show example graphical user interfaces that illustrate various features and functionality described herein with regard to providing a virtual space to members of the virtual space via a display of a mobile device.

In general, FIGS. 3A-3N illustrate mobile device 300 providing a display of graphical user interface 302 (or simply "GUI 302") thereon. In one or more embodiments, mobile device 300 provides GUI 302 via a touchscreen of mobile device 300. Thus, mobile device 300 enables a user to interact with a displayed virtual space via GUI 302 using one or more touch inputs. Alternatively, while one or more embodiments described in connection with FIGS. 3A-3N illustrate features and functionalities associated with virtual spaces provided on mobile device 300, in one or more embodiments, other client devices (e.g., tablets, laptops) enable a user to interact with the displayed virtual space including features described herein.

As mentioned above, digital content management system 104 facilitates display of a virtual space on a client device by providing information to a client device that enables the client device to present a display to a user. In one or more embodiments, digital content management system 104 provides information to a client device having the content management application 110 thereon which renders a display of the virtual space on the client device. Alternatively, in one or more embodiments, digital content management system 104 provides the virtual space to the client device via a website displayed on the client device via a web browser or other third party application. FIGS. 3A-3N illustrate example visualizations of the virtual space as the virtual space would appear on mobile device 300 having content management application thereon 110. Nonetheless, one or more features described below in connection with the examples illustrated in FIGS. 3A-3N can similarly apply to other visualizations of the virtual space on a client device.

As shown in FIG. 3A, GUI 302 includes a listing of virtual spaces to which a user of mobile device 300 has access. For example, as shown in FIG. 3A, the listing includes "Create New Space" field 304, first space 306a (space 1), and second space 306b (space 2). As illustrated, first space 306a has three assets and eight members. As further shown, second space 306b has one asset and two members. In addition, the listing of virtual spaces can include a level of permission of the user with respect to each virtual space. For example, as shown in FIG. 3A, the user of mobile device 300 may have full-access to space 1 because the user is a "creator," and limited-access to space 2.

In addition, as discussed above, digital content management system 104 can allow the user to create a new virtual space. For example, as shown in FIG. 3A, GUI 302 can include a "Create New Space" field 304 including a selectable option. Accordingly, in response to receiving an indication that the user selected "Create New Space" field 304 within GUI 302, digital content management system 104 creates a new virtual space.

Based upon digital content management system 104 creating a new virtual space, GUI 302 updates to include a representation of virtual space 308 (e.g., "New Space" as illustrated in FIG. 3B). As shown in FIG. 3B, GUI 302 includes virtual space header 312 that indicates a name of virtual space 308. In addition, virtual space header 312 includes various selectable options that enable a user to navigate to different features provided in connection with virtual space 308. As an example, the user can select a "spaces" button that navigates back to the listing of spaces shown in FIG. 3A.

In one or more embodiments, virtual space 308 only includes the user that created virtual space 308 because the user did not indicate any additional users to invite to virtual space 308. In this way, the user can create virtual space 308 for the individual user's personal use to have convenient access to digital content items on various storage locations in a single location within virtual space 308. Further, the user can subsequently request to share virtual space 308 to other users based on inviting other users to virtual space 308 (see FIG. 3F).

Figure 3D:
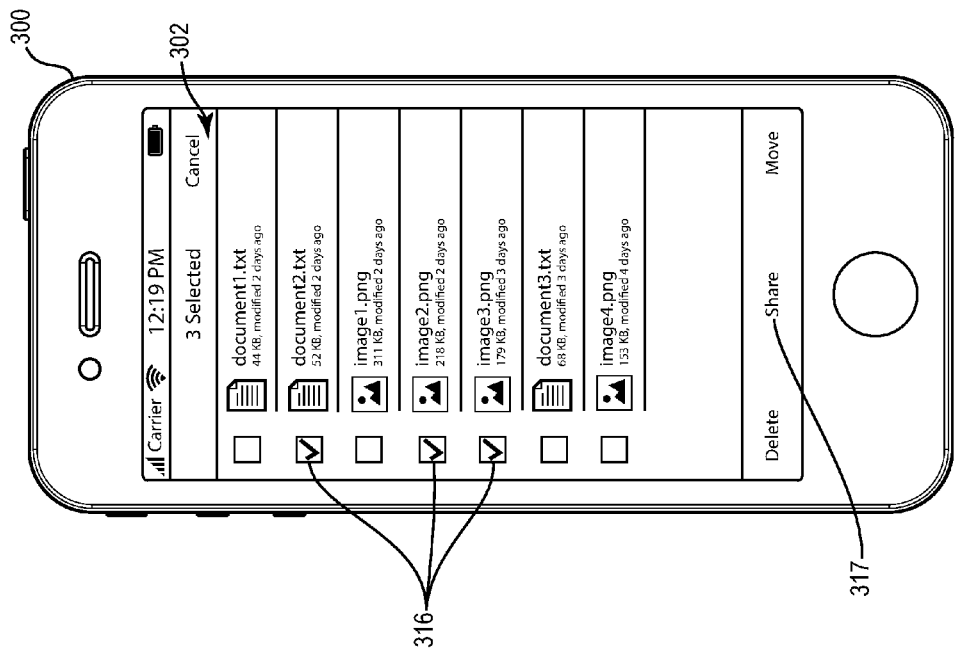
FIGS. 3A-3N illustrate graphical user interfaces showing features of a shared virtual space in accordance with one or more embodiments.
Figure 3C:
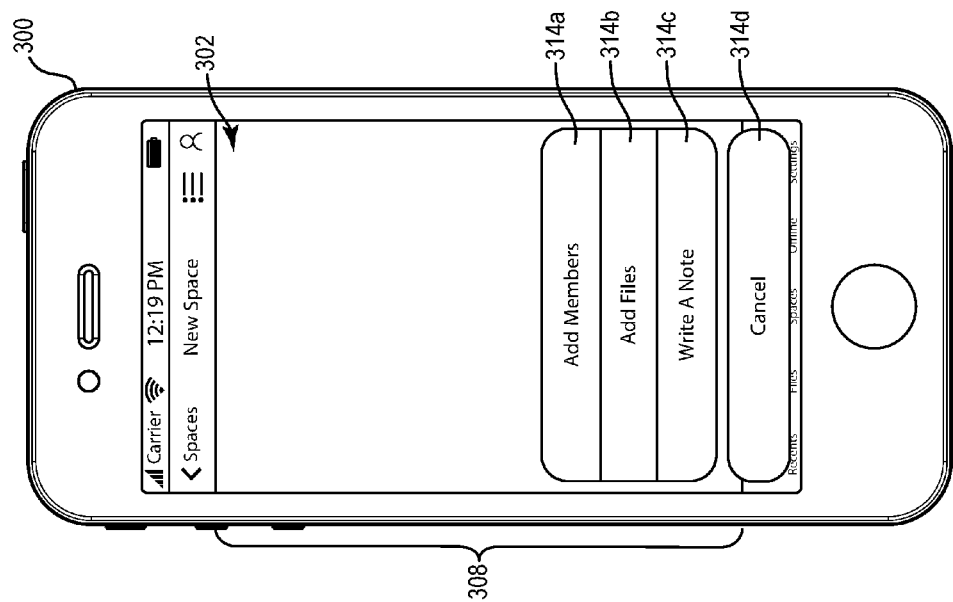

As shown in FIG. 3B, virtual space 308 does not include any assets because the user of mobile device 300 did not indicate (at this point) any digital content items to share within virtual space 308. In one or more embodiments, the user selects add button 310 to add content to virtual space 308. In response, mobile device 300 provides a listing of selectable options that enable the user to add to virtual space 308. For example, as shown in FIG. 3C, in response to the user selecting add button 310, mobile device 300 provides a listing of selectable options 314a-d including "Add Members" option 314a, "Add Files" option 314b, "Write A Note" option 314c, or "Cancel" option 314d. The listing of selectable options can include other options including, for example, a change permissions option.

The user can interact with a selectable option to cause the digital content management system 104 to add digital content items to virtual space 308. For example, in response to the user selecting the "Add Files" option 314b from the listing of selectable options 314a-d, GUI 302 includes a listing of digital content items from which a user can select to add to virtual space 308, as shown in FIG. 3D. In one or more embodiments, the listing of digital content items refers to digital content items on a user's private storage space on digital content management system 104. Alternatively, in one or more embodiments, the listing of digital content items refers to digital content items stored locally on mobile device 300.

In one or more embodiments, the user of mobile device 300 can share any selected digital content items 316 to share with virtual space 308. For example, as shown in FIG. 3D, GUi 302 includes selectable share option 317 that triggers a request to share selected digital content items 316 with virtual space 308. In particular, in response to the user selecting share option 317, mobile device 300 provides a request to share selected digital content items 316 with virtual space 308. In response to receiving the share request, digital content management system 104 generates an asset including shared links 319 that point to or otherwise reference selected digital content items 316. As described above, the asset and shared links 319 include information about selected digital content items 316 including, for example, location(s) of selected digital content items 316, file types of selected digital content items 316, an icon associated with the file types, and any other information that enables members of virtual space 308 to access selected digital content items 316.

As mentioned above, in response to detecting a selection of share option 317, digital content management system 104 creates an asset for virtual space 308 that references each of selected digital content items 316. For example, as shown in FIG. 3E, GUI 302 includes first asset 318a including shared links 319 that point to selected digital content items 316. As illustrated in FIG. 3E, GUI 302 includes displayed asset information including a creator of first asset 318a, a time of creation (i.e., "0s ago"), file size, a date of modification, a file type, and an icon representative of the file type. In addition, as shown in FIG. 3E, first asset 318a includes shared links 319 for different types of files within the same asset.

As shown in FIG. 3E, the displayed first asset 318a includes shared links 319 for each of selected digital content items 316. In particular, as shown in FIG. 3E, first asset 318a includes selectable shared links 319 displayed within first asset 318a. Each of shared links 319 point to a corresponding content item of selected digital content items 316 stored on a storage space of the user on digital content management system 104. Upon detecting a user selection of a shared link, mobile device 300 will access the corresponding digital content item and provide a display of the digital content item within GUI 302 of mobile device 300.

As further shown, GUI 302 includes a displayed option to add a comment (e.g., an asset note) to first asset 318a. For example, as shown in FIG. 3E, first asset 318a includes a comment section. If the user selects the comment option and composes a message, annotation, or other note, the note appears within first asset 318a and mobile device 300 displays the asset note within the graphical object of first asset 318a. In one or more embodiments, generating and adding the asset note to first asset 318a does not change or modify selected digital content items 316 identified by shared links of first asset 318a.

As discussed above, one or more members of virtual space 308 can invite other users to join virtual space 308. For example, as shown in FIG. 3E, a user can select add button 310 to bring up the listing of selectable options illustrated in FIG. 3C. Upon selection of "Add Members" option 314a, mobile device 300 can enable the user to select users from a contact list, buddy list, or other list of user identifiers (e.g., phone numbers, user names, email addresses) that mobile device 300 can access.

As another example, upon selection of "Add Members" option 314, mobile device 300 provides GUI 302 illustrated in FIG. 3F including a list of any members of virtual space 308. Where virtual space 208 does not include any additional members, the listing of members may only include the creator (e.g., John M. Doe) of virtual space 208. As shown in FIG. 3F, GUI 302 includes "Add People To This Space" option 320. Upon selection of "Add People To This Space" option 320, mobile device 300 prompts the user of mobile device 300 to select a contact from a contact list, email address list, or enter a user identifier corresponding to a user to invite to virtual space 208. Upon selection of a user to invite, mobile device 300 can provide an invite to the user to enable the invited user to join virtual space 208. For example, as shown in FIG. 3F, mobile device 300 enables the user to invite "Jenny Turner" to virtual space 208.

In response to the invited user accepting the invitation to join virtual space 208, mobile device 300 provides the new member to the list of members 321. For example, as shown in FIG. 3F, the listing of members 321 includes John M. Doe and Jenny Turner. As further shown, the listing of members 321 includes an indication of member-type (e.g., what level of access) for each of members 321. For example, as shown in FIG. 3F, GUI 302 indicates that John M. Doe is a full-access member while Jenny Turner is a limited-access member. As further shown, the listing of members 321 includes contact information for each member 321. In one or more embodiments, the mobile device 300 groups the listing of members 321 by member-type. For example, the listing of members 321 may include each full-access member in a first group and each limited-access member in a second group.

In one or more embodiments, digital content management system 104 enables a user (e.g., full-access member, creator) to change the member-type for one or more of the members. For example, in one or more embodiments, a creator of virtual space 308 can change a full-access member to a limited access member or, alternatively, a limited access member to a full-access member. In one or more embodiments, new members join virtual space 308 as a limited-access member in accordance with a default setting. The creator can then change the status of the new member to be a full-access (or other level of access) member of virtual space 308.

As mentioned above, each of members 321 (or just full-access members) can invite other users to join virtual space. For example, as discussed above and as shown in FIG. 3F, the user can select "Add People to This Space" option 320 and enter an identification of a user to invite to virtual space 308. The user can enter a username, email address, phone number, or other identifier of a user that enables virtual space system 106 to send an invite to a user to join virtual space 308. In one or more embodiments, mobile device 300 further provides a display of invited users that have not yet joined virtual space 308. In one or more embodiments, invited users receive access to virtual space 308 with or without accepting the invitation to join virtual space 308. Alternatively, in one or more embodiments, only those members that have accepted or otherwise confirmed an invitation receive access to virtual space 308.

As shown in FIG. 3G, one or more members 320 of virtual space 308 can add additional digital content to virtual space 308. For example, in one or more embodiments, a limited-access member (or full-access member) can add content to virtual space 308 by selecting add button 310 and subsequently selecting "Add Files" option 314b shown in FIG. 3C. The member can follow a similar process of selecting digital content items and requesting to share the selected digital content items with virtual space 308 as described above in connection with FIGS. 3D and 3E.

In response to receiving or otherwise detecting the request to share the selected digital content item, digital content management system 104 creates a second asset including an identification of the identified digital content item(s) and adds the second asset to virtual space 308. For example, as shown in FIG. 3G, GUI 302 includes second asset 318b including a shared link to a digital content item shared by Jenny Turner.

As shown in FIG. 3G, GUI 302 includes a first graphical object for first asset 318a and a second graphical object for second asset 318b within virtual space 308. As further shown, GUI 302 includes second asset 318b presented in-line with first asset 318a previously added to virtual space 308 by John M. Doe. In one or more embodiments, mobile device 300 enables the user to scroll through virtual space 308 (e.g., using touch inputs) to view any number of assets displayed in-line with each other. As shown in FIG. 3F, GUI 302 includes assets 318a-b displayed in chronological order. Alternatively, in one or more embodiments, GUI 302 includes assets 318a-b displayed in order according to file size, user-assigned importance, in accordance with most recent comments, or other method for ordering assets 318a-b.

As mentioned above, one or more embodiments of digital content management system 104 enables sharing of digital content items from user storage spaces hosted by digital content management system 104. Nevertheless, as discussed above, digital content management system 104 additional enables sharing of digital content items from local storage (e.g., a camera roll) on mobile device 300. As an example, the user of mobile device 300 can navigate to a gallery of images stored on mobile device 300 and select a number of images to share with virtual space 308. For example, as shown in FIG. 3H, GUI 302 includes a gallery of example images including three selected images 322. Upon selecting images 322, the user can select an add option or other sharing option that facilitates a request to share selected images 322 with virtual space 308.

As discussed above, where the request to share includes an identification of digital content stored on mobile device 300, digital content management system 104 generates (e.g., uploads) a copy of the selected digital content and adds the copy of the digital content to a storage space associated with the user or other member of virtual space 308. In addition, in response to receiving the request to share the digital content, digital content management system 104 generates an asset for the share including shared links that identify each of the selected digital content items and points to a location (e.g., the user storage storing the uploaded copies). In addition, digital content management system 104 adds the new asset including the shared links to virtual space 308 including the shared links that point to the uploaded copies of the digital content.

Figure 3I:
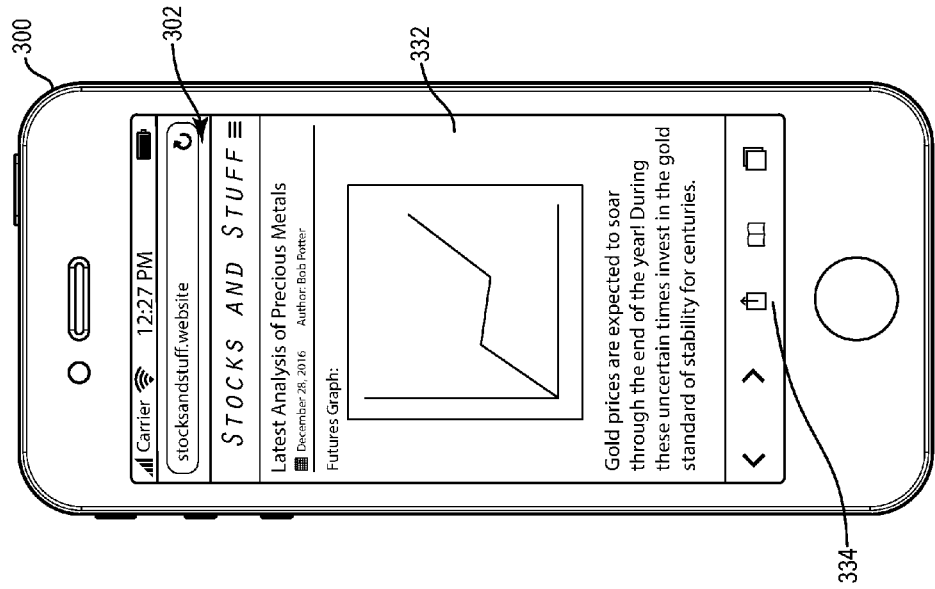

In one or more embodiments, prior to creating the asset and/or adding the asset to virtual space 308, mobile device 300 can further enable the creator of the asset (e.g., user of mobile device 300) to compose a message, heading, or other content to be displayed within the generated asset. For example, as shown in FIG. 3I, mobile device 300 provides asset creation interface 326 that enables the user to add a message about the shared images 312. Further, mobile device 300 enables the user to select a particular space as a destination for the asset that references selected images 312. For example, as shown in FIG. 3I, asset creation interface 326 includes a selectable option to add selected images 322 to virtual space 308. In one or more embodiments, asset creation interface 326 includes virtual space options 328, 330 that enable the user to select a particular virtual space for sharing selected images 322. For example, asset creation interface 326 includes first virtual space icon 328 corresponding to a virtual space entitled "Family" and second virtual space icon 330 corresponding to a virtual space entitled "New Space."

Figure 3J:
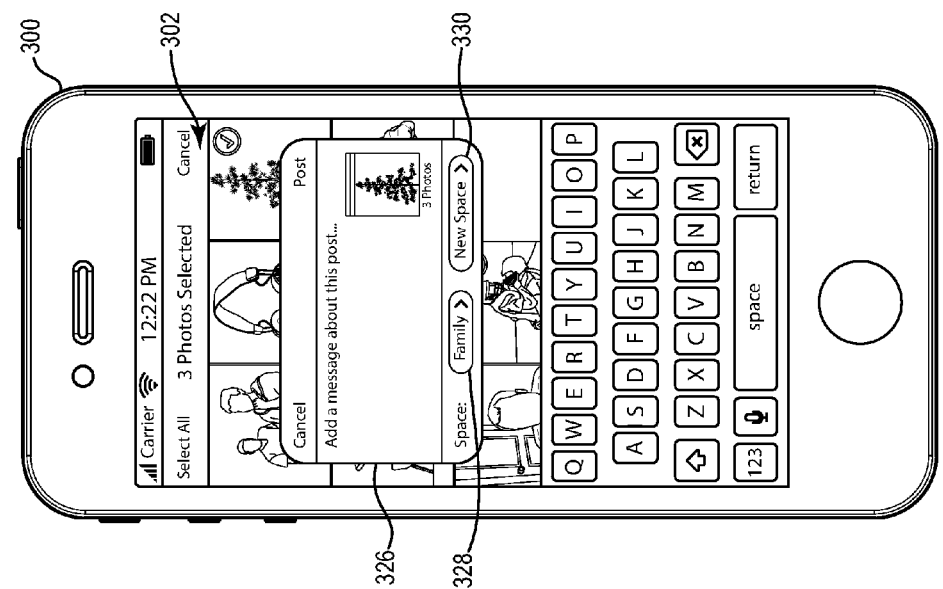

In addition to adding digital content items previously stored on local storage of mobile device 300, in one or more embodiments, digital content management system 104 enables the user of mobile device 300 to add assets that reference digital content from third-party sources. For example, when browsing a website via a web browser, mobile device 300 can display a share icon that enables the user to request to share the website (or specific content from the website with virtual space 308. For example, as shown in FIG. 3J, while visiting website 332, the user can select share icon 334 to request sharing website 332 with virtual space 308.

In response to detecting the user selection of the share icon 334, mobile device 300 can provide a request to digital content management system 104 including an identification of website 322 (e.g., location) and/or any specific content within website 322 to share with virtual space 308. In response, digital content management system 104 generates an asset including a shared link that points to website 322 or specific content within website 322. Further, similar to other embodiments for adding assets to virtual space 308, in one or more embodiments, mobile device 300 provides asset creation interface 336 including virtual space icons 338, 340 that enable the user to select a particular virtual space for the created asset.

As shown in FIG. 3L, GUI 302 includes a display of assets corresponding to the shared locally-stored images and the website described above in connection with FIGS. 3H-3K. For example, as shown in FIG. 3L, GUI 302 includes a display of third asset 318c including shared links that point to uploaded copies of the locally-stored images. In addition, as shown in FIG. 3L, GUI 302 includes a display of fourth asset 318d including a shared link to website 322. As further shown, the displays of third and fourth assets 318c-d include messages added via asset creation interfaces 326, 336 for each respective asset 308c-d. As described above, the user can scroll through virtual space 308 on graphical user interface 302 to view each asset 308a-d previously added to virtual space 308.

As described above, mobile device 300 further enables the user to add a space (e.g., space-wide) comment to virtual space 308. For example, as shown in FIG. 3M, in response to detecting a user selection of add button 310, mobile device 300 provides a space note interface 342 that enables the user to start a discussion or generally leave a comment within virtual space 308. In particular, to leave a note, a user can select "Leave a comment" field 344 and compose a note. After completing the note, the user can select "Post" button to cause digital content management system 104 to add the space note to virtual space 308.

In particular, after detecting a selection of "Post" button 346, mobile device 300 provides the composed message to digital content management system 104. Digital content management system 104 creates the space note (or an asset including the space note) including the composed message. Digital content management system 104 then adds the created space note to virtual space 308. For example, as shown in FIG. 3N, GUI 302 includes created space note 348 in-line with other assets of virtual space 308. Similar to other assets, space note 348 includes information about space note 348 including an identification of the user who created the note and a time of creation. It is appreciated that creating and adding space note 348 to virtual space 308 does not modify any assets 308a-d or digital content referenced by any of assets 308a-d.

FIGS. 1-3N, the corresponding text, and the examples, provide a number of different systems and devices that facilitates creation of a virtual space and enabling members of the virtual space to collaborate with respect to digital content shared to the virtual space. In addition to the foregoing, embodiments can also be described in terms of flowcharts comprising acts and steps in a method for accomplishing a particular result. For example, FIGS. 4-5 illustrate flowcharts of exemplary methods and acts in accordance with one or more embodiments.

Figure 4:
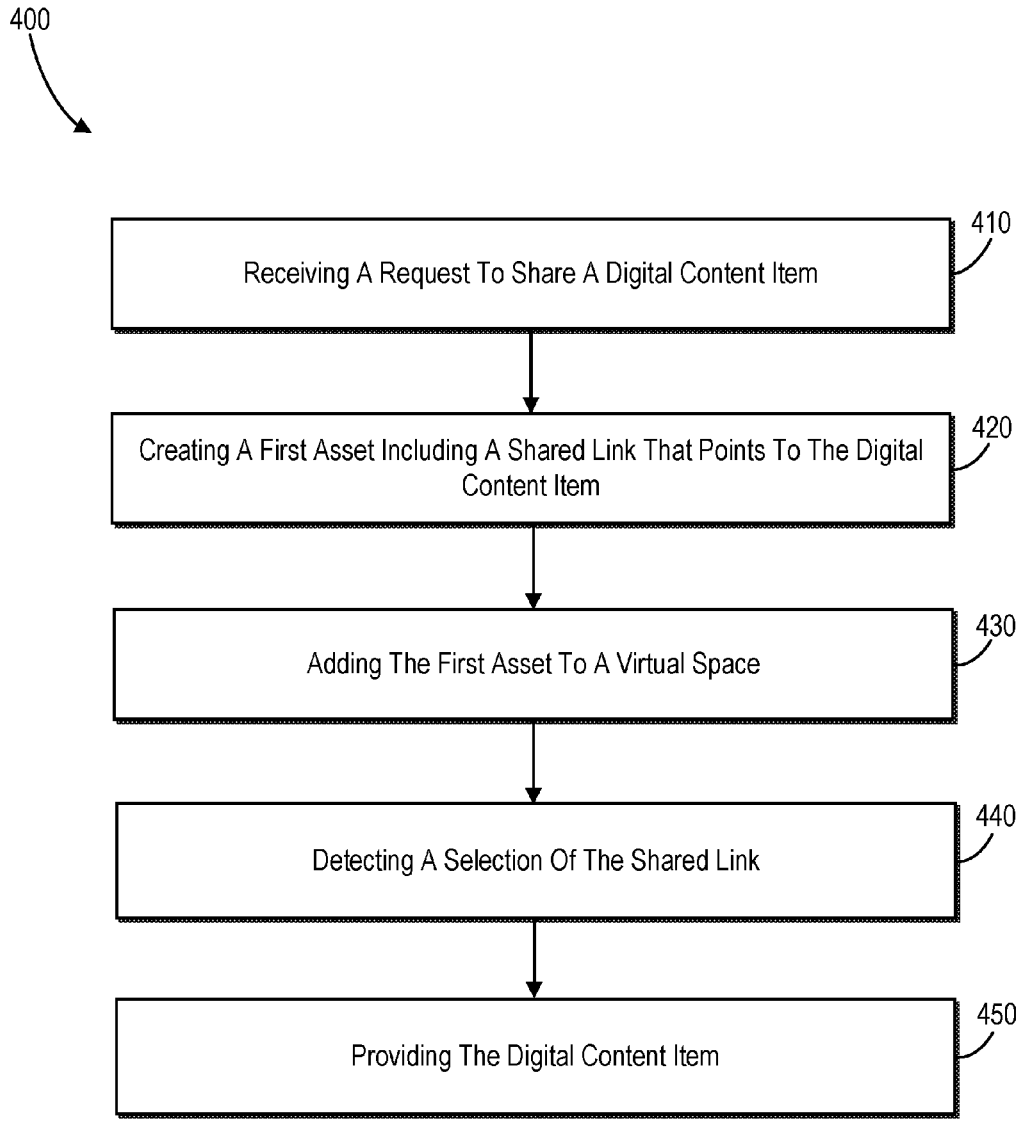
FIG. 4 illustrates a flowchart of a series of acts in a method for sharing digital content via a virtual space in accordance with one or more embodiments.
Figure 5:
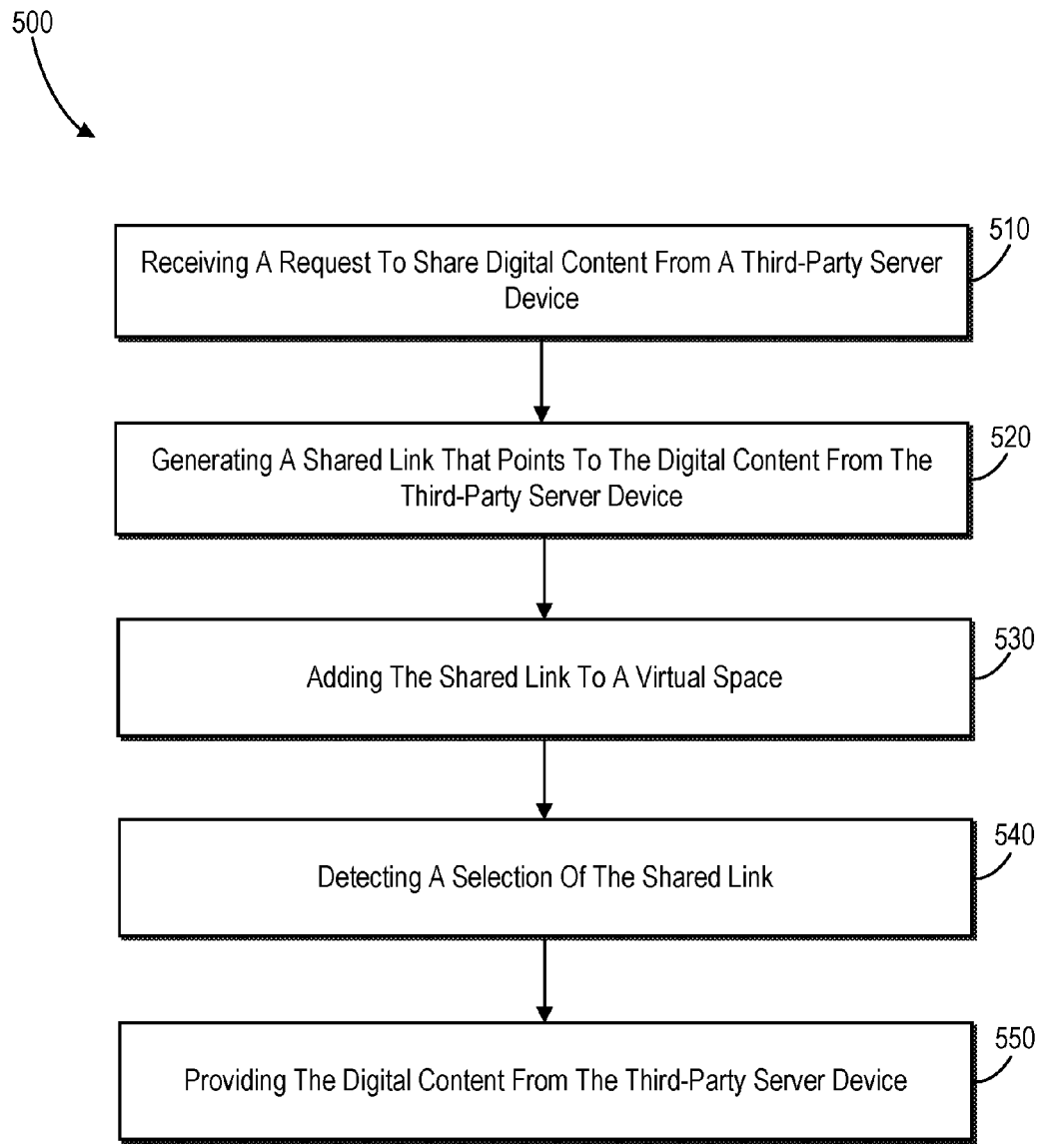
FIG. 5 illustrates another flowchart of a series of acts in a method for sharing digital content via a virtual space in accordance with one or more embodiments.

FIG. 4 illustrates a flowchart of one example method 400 of providing a virtual space to members of the virtual space. While FIG. 4 illustrates example steps according to one embodiment, other embodiments may omit, add to, reorder, and/or modify any of the steps shown in FIG. 4. Additionally, one or more steps shown in FIG. 4 may be performed by a client device, server device, or combination of components located thereon.

As shown in FIG. 4, method 400 includes act 410 of receiving a request to share a digital content item 410. For example, in one or more embodiments, act 410 involves receiving, from a first client device corresponding with a first user of a digital content management system 104, a request to share, with a second user, a digital content item from a private storage space on the digital content management system associated with the first user. In one or more embodiments, method 400 includes creating a virtual space in response to receiving the request to share the digital content item. In addition, one or more embodiments of method 400 includes associating the first user and the second user with the virtual space. In one or more embodiments, associating the first user and the second user with the virtual space involve providing access to the virtual space to the first user and the second user. In one or more embodiments, receiving the request to share the digital content item includes a request to add the digital content item to a previously created virtual space accessible to the first user and the second user.

As further shown in FIG. 4, method 400 includes act 420 of creating a first asset including a shared link that points to the digital content item. For example, in one or more embodiments, act 420 includes, in response to receiving the request to share the digital content item, creating a first asset comprising a shared link that points to the digital content item within the private storage space associated with the first user. In one or more embodiments, creating the first asset (or any other asset) involves maintaining permissions associated with accessing the digital content item referenced by the first asset. For example, in one or more embodiments, permissions are different between the first user and the second user.

As further shown in FIG. 4, method 400 includes act 430 of adding the first asset to a virtual space. For example, in one or more embodiments, act 430 involves adding the first asset to a virtual space hosted by digital content management system 104 where the virtual space is accessible to the first user and the second user. The virtual space is accessible to the first user, second user, and any other members of the virtual space. In one or more embodiments, adding the first asset to the virtual space involves providing the first asset within the virtual space in-line with one or more additional assets previously added to the virtual space. Further, in one or more embodiments, method 400 involves providing, (e.g., within a graphical object of the first asset within the virtual space) an option to compose a note for the first asset without modifying the digital content item on the private storage space associated with the first user. In addition, in one or more embodiments, in response to adding the first asset to the virtual space, method 400 involves providing, to the second client device associated with the second user, a notification of the addition of the first asset to the virtual space.

Further, in one or more embodiments, method 400 involves providing a graphical representation of the virtual space to the first client device associated with the first user and the second client device associated with the second user. In one or more embodiments, providing the graphical representation of the virtual space includes virtual space data and first asset data to the client devices. In one or more embodiments, the virtual space data includes an identification of any members of the virtual space (e.g., first and second users) and one or more comments added to the virtual space by one or more of the members of the virtual space. In addition, in one or more embodiments, the first asset data includes (in addition to the shared link) one or more permissions associated with digital content referenced by the first asset, an identification of an owner of the digital content item (e.g., the user who added the first asset to the virtual space), and one or more comments corresponding to the first asset.

As further shown in FIG. 4, method 400 includes act 440 of detecting a selection of the shared link. For example, in one or more embodiments, act 440 involves receiving, from a second client device corresponding to the second user, an indication that the second user selected the shared link within the first asset. For instance, the second user can click on, touch, or otherwise select the shared link displayed within a graphical object representing the first asset displayed within the virtual space. Method 400 further includes act 450 of providing the digital content item to the second user. For example, in one or more embodiments, act 450 involves, in response to receiving the indication of the second user selecting the shared link, providing the digital content item to the second client device associated with the second user.

In one or more embodiments, method 400 further includes receiving a request to add a second digital content item to the virtual space. For example, receiving the request to add the second digital content item to the virtual space can include receiving, from the first or second user, a request to share the second digital content item with other members of the virtual space (e.g., the first and/or second user). In response to receiving the request to add the second digital content item to the virtual space, method 400 can include creating a second asset including a second shared link that points to the second digital content item. In one or more embodiments, receiving the request to add the second digital content item includes receiving, from the second user, an identification of the second digital content item from a private storage space on digital content management system 104 associated with the second user. Alternatively, in one or more embodiments, receiving the request includes receiving a request to share digital content from a third-party server located on a server device that is remote from one or more server devices of digital content management system 104. In this case, creating the second asset involves creating an asset that includes a shared link to web content on the third-party server located on the server device that is remote from one or more server devices of digital content management system 104.

In one or more embodiments, receiving the request to share the second digital content item involves receiving a request to share a digital content item stored locally on a client device of the first user or second user. In particular, the digital content item stored locally on the client device is not on the private storage space associated with the first user or the second user prior to receiving the request to add the second digital content item to the virtual space. In response, method 400 includes uploading a copy of the digital content item stored locally on the client device and storing the copy of the digital content item stored locally on the client device on the private storage space associated with the first user on digital content management system 104. Further, in one or more embodiments, the shared link of the second asset points to the copy of the digital content item on the private storage space associated with the first user (or other user who requested to share the locally stored digital content item).

In one or more embodiments, method 400 can include adding a third user to the virtual space. In particular, any number of users can be added to the virtual space. In one or more embodiments, upon adding the third user to the virtual space, method 400 includes providing access to the digital content items referenced by the first asset and the second asset. In one or more embodiments, adding the third user further provides access to any number of digital content items referenced by one or more additional assets previously added to the virtual space.

Moreover, in one or more embodiments, method 400 can include receiving a request to add a plurality of digital content items to the virtual space. In one or more embodiments, in response to receiving the request to add the plurality of digital content items to the virtual space, method 400 includes creating another corresponding asset (e.g., second or third asset) comprising a plurality of shared links. Each shared link of the plurality of shared links points to a respective digital content item of the plurality of digital content items identified within the request to add the plurality of digital content items to the virtual space. Thus, the asset can include multiple shared links to multiple digital content items.

FIG. 5 illustrates a flowchart of another example method 500 of providing a virtual space to members of the virtual space. While FIG. 5 illustrates example steps according to one embodiment, other embodiments may omit, add to, reorder, and/or modify any of the steps shown in FIG. 5. Additionally, one or more steps shown in FIG. 5 may be performed by a client device, server device, or combination of components located thereon. Moreover, in one or more embodiments, method 500 includes one or more steps of method 400 described above in connection with FIG. 4.

As shown in FIG. 5, method 500 includes act 510 of receiving a request to share digital content from a third-party server device. For example, in one or more embodiments, act 510 includes receiving, from a first client device corresponding to a first user of digital content management system 104, a request to share, with a second user, digital content from a third-party server device that is remote from digital content management system 104. In one or more embodiments, the digital content includes a digital content item from a third-party server device that is remote from digital content management system 104.

As further shown in FIG. 5, method 500 includes act 520 of generating a shared link that points to the digital content from the third-party server device. For example, in one or more embodiments, act 520 includes in response to receiving the request to share the digital content from the third-party server device, generating a first asset including a shared link that points to the digital content item from the third-party server device.

As further shown in FIG. 5, method 500 includes act 530 of adding the shared link to a virtual space. For example, in one or more embodiments, act 530 includes the first asset to a virtual space hosted by the digital content management system where the virtual space is accessible to the first user and the second user.

As further shown in FIG. 5, method 500 includes act 540 of detecting a selection of the shared link. For example, in one or more embodiments, act 540 includes receiving, from a second client device corresponding to the second user, an indication that the second user selected the shared link within the first asset. Method 500 further includes act 550 of providing the digital content from the third-party server device. For example, in one or more embodiments, act 550 includes, in response to receiving the indication of the second user selecting the shared link, providing the digital content item to the second client device associated with the second user.

Moreover, in one or more embodiments, method 500 includes receiving, from the first user of the digital content management system, a request to add a locally-stored digital content item on a client device of the first user (or second user) to the virtual space. In response to receiving the request to add the locally-stored digital content item to the virtual space, one or more embodiments of method 500 includes uploading a copy of the locally-stored digital content item to a personal storage space associated with the first user on digital content management system 104. In one or more embodiments, method 500 further includes creating a second asset including another shared link that points to the copy of the locally-stored digital content item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
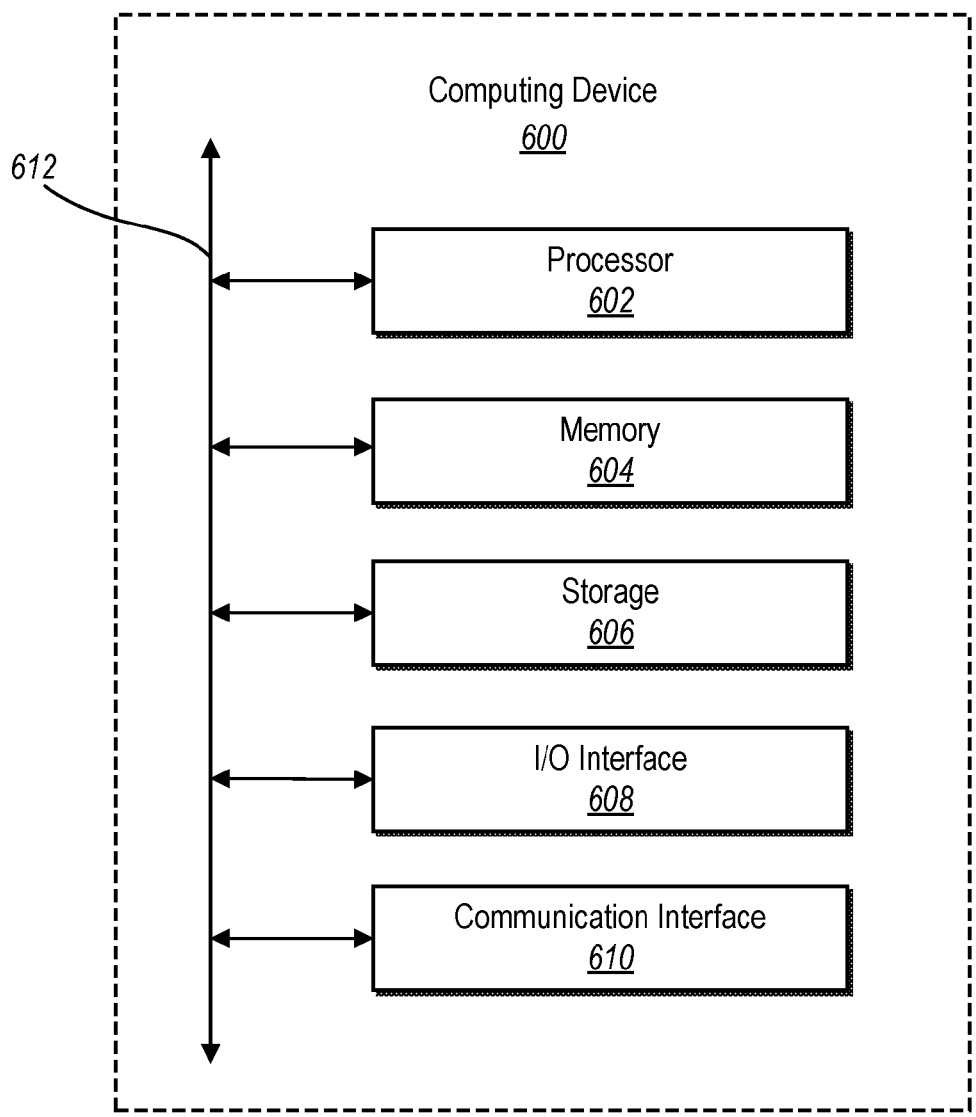
FIG. 6 illustrates a block diagram of a computing device in accordance with one or more embodiments.

FIG. 6 illustrates a block diagram of exemplary computing device 600 that may be configured to perform one or more of the processes described above. One will appreciate that client devices 108a-n and/or server device(s) 102 may comprise one or more computing devices such as computing device 600. As shown by FIG. 6, computing device 600 can comprise processor 602, memory 604, storage device 606, I/O interface 608, and communication interface 610, which may be communicatively coupled by way of communication infrastructure 612. While an exemplary computing device 600 is shown in FIG. 6, the components illustrated in FIG. 6 are not intended to be limiting. Additional or alternative components may be used in other embodiments. Furthermore, in certain embodiments, computing device 600 can include fewer components than those shown in FIG. 6. Components of computing device 600 shown in FIG. 6 will now be described in additional detail.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage device 606 and decode and execute them. In particular embodiments, processor 602 may include one or more internal caches for data, instructions, or addresses. As an example and not by way of limitation, processor 602 may include one or more instruction caches, one or more data caches, and one or more translation lookaside buffers (TLBs). Instructions in the instruction caches may be copies of instructions in memory 604 or storage 606.

Memory 604 may be used for storing data, metadata, and programs for execution by the processor(s). Memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 604 may be internal or distributed memory.

Storage device 606 includes storage for storing data or instructions. As an example and not by way of limitation, storage device 606 can comprise a non-transitory storage medium described above. Storage device 606 may include a hard disk drive (HDD), a floppy disk drive, flash memory, an optical disc, a magneto-optical disc, magnetic tape, or a Universal Serial Bus (USB) drive or a combination of two or more of these. Storage device 606 may include removable or non-removable (or fixed) media, where appropriate. Storage device 606 may be internal or external to computing device 600. In particular embodiments, storage device 606 is non-volatile, solid-state memory. In other embodiments, Storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 608 allows a user to provide input to, receive output from, and otherwise transfer data to and receive data from computing device 600. I/O interface 608 may include a mouse, a keypad or a keyboard, a touch screen, a camera, an optical scanner, network interface, modem, other known I/O devices or a combination of such I/O interfaces. I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 608 is configured to provide graphical data to a display for presentation to a user. The graphical data may be representative of one or more graphical user interfaces and/or any other graphical content as may serve a particular implementation.

Communication interface 610 can include hardware, software, or both. In any event, communication interface 610 can provide one or more interfaces for communication (such as, for example, packet-based communication) between computing device 600 and one or more other computing devices or networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 612 may include hardware, software, or both that couples components of computing device 600 to each other. As an example and not by way of limitation, communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
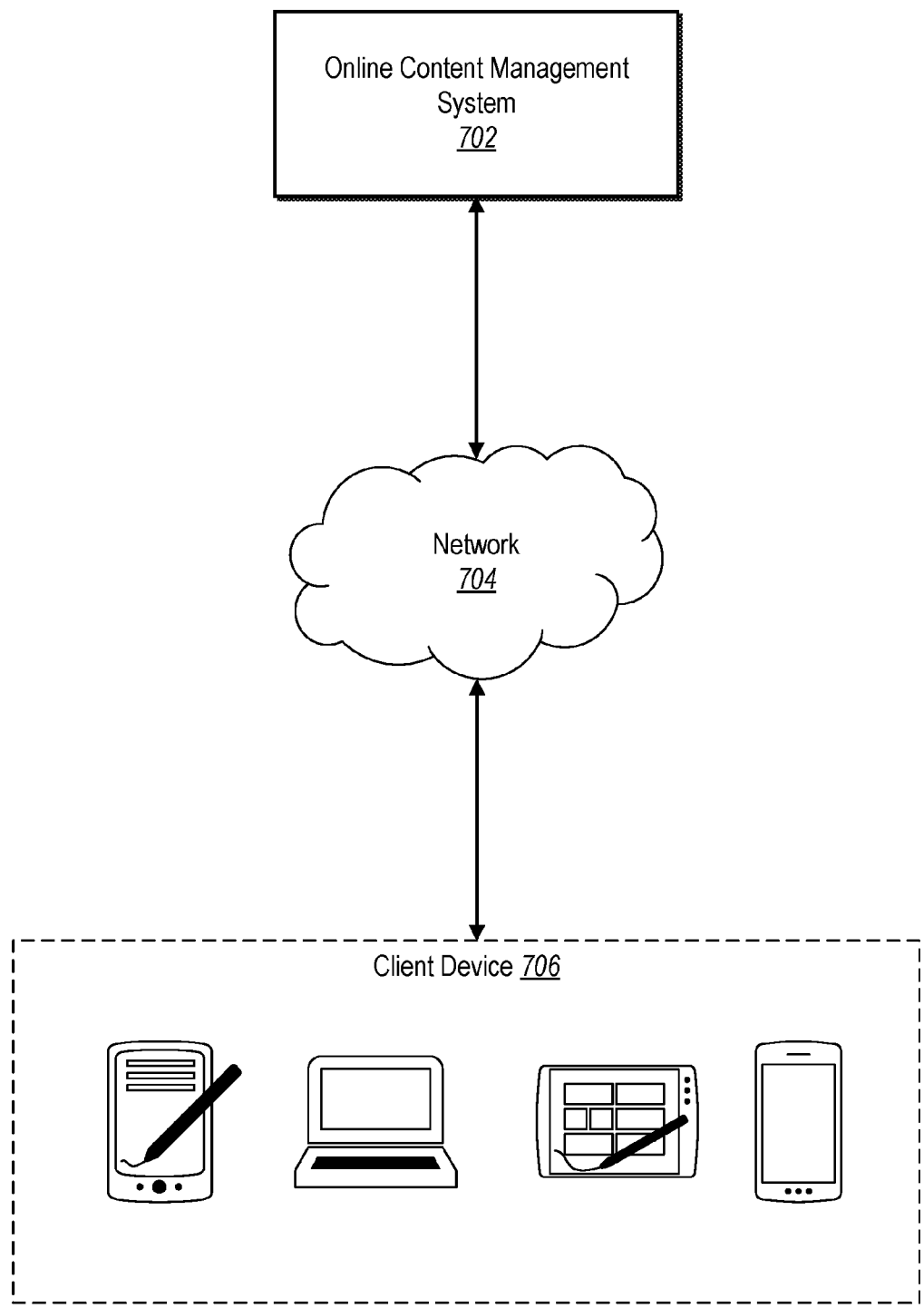
FIG. 7 illustrates a networking environment of an online content management system in accordance with one or more embodiments.

FIG. 7 is a schematic diagram illustrating an environment within which one or more embodiments of storage account manager 105 and virtual space system 106 can be implemented. Online content management system 702 may generate, store, manage, receive, and send digital content (such as digital videos). For example, online content management system 702 may send and receive digital content to and from client devices 706 by way of network 704. In particular, online content management system 702 can store and manage a collection of digital content. Online content management system 702 can manage the sharing of digital content between computing devices associated with a plurality of users. For instance, online content management system 702 can facilitate a user sharing a digital content with another user of online content management system 702.

In particular, online content management system 702 can manage synchronizing digital content across multiple client devices 706 associated with one or more users. For example, a user may edit digital content using client device 706. The online content management system 702 can cause client device 706 to send the edited digital content to online content management system 702. Online content management system 702 then synchronizes the edited digital content on one or more additional computing devices.

In addition to synchronizing digital content across multiple devices, one or more embodiments of online content management system 702 can provide an efficient storage option for users that have large collections of digital content. For example, online content management system 702 can store a collection of digital content on online content management system 702, while the client device 706 only stores reduced-sized versions of the digital content. A user can navigate and browse the reduced-sized versions (e.g., a thumbnail of a digital image) of the digital content on client device 706. In particular, one way in which a user can experience digital content is to browse the reduced-sized versions of the digital content on client device 706.

Another way in which a user can experience digital content is to select a reduced-size version of digital content to request the full- or high-resolution version of digital content from online content management system 702. In particular, upon a user selecting a reduced-sized version of digital content, client device 706 sends a request to online content management system 702 requesting the digital content associated with the reduced-sized version of the digital content. Online content management system 702 can respond to the request by sending the digital content to client device 706. Client device 702, upon receiving the digital content, can then present the digital content to the user. In this way, a user can have access to large collections of digital content while minimizing the amount of resources used on client device 706.

Client device 706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 706 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 704.

Network 704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 706 may access online content management system 702.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method, comprising
receiving, from a first client device corresponding with a first user of a digital content management system, a request to share, with a second user, a digital content item from a private storage space on the digital content management system associated with the first user;

in response to receiving the request to share the digital content item, creating a first asset comprising a shared link that points to the digital content item within the private storage space associated with the first user;

adding the first asset to a virtual space hosted by the digital content management system, wherein the virtual space does not include the digital content item and does not include a copy of the digital content item;

associating a first permission setting with the virtual space that allows the first user and the second user to access the virtual space;

associating a second permission setting with the shared link within the first asset, wherein the second permission setting associated with the shared link limits the second user's access to the digital content item from the private storage space associated with the first user;

receiving, from a second client device corresponding to the second user, an indication that the second user selected the shared link within the first asset of the virtual space; and in response to receiving the indication that the second user selected the shared link, and based on the second permission setting associated with the shared link, providing the second client device associated with the second user limited access to the digital content item.

2. The method of claim 1, further comprising:
receiving a request to share a second digital content item; and
in response to receiving the request to share the second digital content item, creating a second asset comprising a second shared link that points to the second digital content item.

3. The method of claim 2, wherein receiving the request to share the second digital content item comprises receiving, from the second user, an identification of the second digital content item from a private storage space on the digital content management system associated with the second user.

4. The method of claim 2, wherein the shared link is a link to content on a third-party server located on a server device that is remote from one or more server devices of the digital content management system.

5. The method of claim 2, wherein receiving the request to share the second digital content item comprises receiving a request to share a digital content item stored locally on the first client device corresponding to the first user, wherein the digital content item stored locally on the first client device is not on the private storage space associated with the first user prior to receiving the request to add the second digital content item to the virtual space.

6. The method of claim 5, wherein, in response to receiving the request to share the second digital content item, the method further comprises:
uploading a copy of the digital content item stored locally on the first client device; and
storing the copy of the digital content item stored locally on the first client device on the private storage space associated with the first user.

7. The method of claim 6, wherein the second shared link of the second asset points to the copy of the digital content item on the private storage space associated with the first user.

8. The method of claim 1, further comprising:
adding a third user to the virtual space; and
associating a third permission setting with the shared link within the first asset, wherein the third permission setting provides full access to the digital content item; and providing, to a third client device associated with the third user, full access to the digital content item based on the third permission setting associated with the shared link within the first asset of the virtual space.

9. The method of claim 1, further comprising:
generating the virtual space in response to receiving the request to share the digital content item; and
associating the first user and the second user with the virtual space.

10. The method of claim 1, wherein receiving the request to share the digital content item comprises receiving a request to share the digital content item via a previously created virtual space accessible to the first user and the second user.

11. A system, comprising:
at least one processor; and
a non-transitory computer-readable storage medium storing instructions thereon that, when executed by the at least one processor, cause the system to perform steps comprising:
receive, from a first client device corresponding with a first user of a digital content management system, a request to share, with a second user, a digital content item from a private storage space on the digital content management system associated with the first user;
in response to receiving the request to share the digital content item, create a first asset comprising a shared link that points to the digital content item within the private storage space associated with the first user;
add the first asset to a virtual space hosted by the digital content management system, wherein the virtual space does not include the digital content item and does not include a copy of the digital content item;
associate a first permission setting with the virtual space that allows the first user and the second user to access the virtual space;
associate a second permission setting with the shared link within the first asset of the virtual space, wherein the second permission setting associated with the shared link limits the second user's access to the digital content item from the private storage space associated with the first user;
receive, from a second client device corresponding to the second user, an indication that the second user selected the shared link within the first asset of the virtual space; and
in response to receiving the indication that the second user selected the shared link, and based on the second permission setting associated with the shared link, provide the second client device associated with the second user limited access to the digital content item.

12. The system of claim 11, further comprising instructions that, when executed by the at least one processor, cause the system to:
receive a request to share a plurality of digital content items; and
in response to receiving the request to share the plurality of digital content items, create a second asset in the virtual space, the second asset comprising a plurality of shared links that point to respective digital content items of the plurality of digital content items.

13. The system of claim 11, further comprising instructions that, when executed by the at least one processor, cause the system to provide an option to the second user to compose a note for the first asset without modifying the digital content item on the private storage space associated with the first user.

14. The system of claim 11, further comprising instructions that, when executed by the at least one processor, cause the system to maintain access permissions associated with each of the first user and the second user, wherein the access permissions are different between the first user and the second user.

15. The system of claim 11, further comprising instructions that, when executed by at least one processor, cause the system to provide a graphical representation of the virtual space to the first client device associated with the first user and the second client device associated with the second user.

16. The system of claim 15, wherein the graphical representation of the virtual space comprises:
virtual space data comprising an identification of any members of the virtual space and one or more comments added to the virtual space by one or more of the members of the virtual space; and
first asset data comprising one or more permissions associated with digital content referenced by the first asset, an identification of an owner of the digital content item, and one or more comments corresponding to the first asset.

17. A method, comprising:
receiving, from a first client device corresponding to a first user of a digital content management system, a request to share, with a second user, a digital content item from a third-party server device that is remote from the digital content management system;
in response to receiving the request to share the digital content from the third-party server device:
generating a copy of the digital content from the third-party server device;
adding the copy of the digital content from the third-party server device to a private storage space on the digital content management system associated with the first user; and
generating a first asset comprising a shared link that points to the copy of the digital content item on the private storage space on the digital content management system associated with the first user;
adding the first asset to a virtual space hosted by the digital content management system, wherein the virtual space does not include the digital content item and does not include a copy of the digital content item;
associating a first permission setting with the virtual space that allows the first user and the second user to access the virtual space;
associating a second permission setting with the shared link within the first asset, wherein the second permission setting associated with the shared link limits the second user's access to the digital content item from the private storage space associated with the first user;
receiving, from a second client device corresponding to the second user, an indication that the second user selected the shared link within the first asset of the virtual space; and
in response to receiving the indication that the second user selected the shared link, and based on the second permission setting associated with the shared link, providing the second client device associated with the second user limited access to the copy of the digital content item.

18. The method of claim 17, further comprising:
receiving, from the first client device, a request to add a locally-stored digital content item stored on the first client device to the virtual space;
in response to receiving the request to add the locally-stored digital content item to the virtual space, uploading a copy of the locally-stored digital content item to the private storage space on the digital content management system associated with the first user; and
creating a second asset comprising another shared link that points to the copy of the locally-stored digital content item on the private storage space associated with the first user.

19. The method of claim 17, further comprising, in response to adding the first asset to the virtual space, providing, to the second client device associated with the second user, a notification of the addition of the first asset to the virtual space.

20. The method of claim 17, wherein adding the first asset to the virtual space comprises providing the first asset in line with one or more additional assets previously added to the virtual space.

* * * * *